US012795695B2

(12) United States Patent
Nguyen et al.

(10) Patent No.: US 12,795,695 B2
(45) Date of Patent: Nov. 10, 2026

(54) SIDELINK CHANNEL COEXISTENCE BY MULTIPLE RADIO ACCESS TECHNOLOGIES IN NON OVERLAPPING RESOURCES OF A RESOURCE GROUP

(71) Applicant: QUALCOMM INCORPORATED, San Diego, CA (US)

(72) Inventors: Tien Viet Nguyen, Bridgewater, NJ (US); Sourjya Dutta, San Diego, CA (US); Kapil Gulati, Belle Mead, NJ (US); Stelios Stefanatos, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/264,234

(22) PCT Filed: Feb. 10, 2022

(86) PCT No.: PCT/US2022/070604
§ 371 (c)(1),
(2) Date: Aug. 3, 2023

(87) PCT Pub. No.: WO2022/192826
PCT Pub. Date: Sep. 15, 2022

(65) Prior Publication Data

US 2024/0314809 A1 Sep. 19, 2024

(30) Foreign Application Priority Data

Mar. 11, 2021 (GR) .............................. 20210100150

(51) Int. Cl.
*H04W 72/25* (2023.01)
*H04W 72/566* (2023.01)

(52) U.S. Cl.
CPC ......... *H04W 72/25* (2023.01); *H04W 72/566* (2023.01)

(58) Field of Classification Search
CPC ............................ H04W 72/25; H04W 72/566
See application file for complete search history.

(56) References Cited

U.S. PATENT DOCUMENTS

2019/0320475 A1* 10/2019 Li ....................... H04W 72/121
2021/0204307 A1 7/2021 Lee et al.
(Continued)

FOREIGN PATENT DOCUMENTS

WO WO-2020032698 A1 2/2020
WO WO-2020069111 A1 4/2020

OTHER PUBLICATIONS

ETSI TR 137 985: “LTE; 5G; Overall Description of Radio Access Network (RAN) Aspects for Vehicle-to-Everything (V2X) Based on LTE and NR (3GPP TR 37.985 version 16.0.0 Release 16)”, ETSI Technical Report, European Telecommunications Standards Institute (ETSI), 650, Route Des Lucioles, F-06921 Sophia-Antipolis, France vol. 3GPP Ran, No. V16.0 .0, Jul. 29, 2020, 37 Pages, XP014379053.
(Continued)

*Primary Examiner* — Won Tae C Kim
(74) *Attorney, Agent, or Firm* — QUALCOMM Incorporated

(57) ABSTRACT

Methods, systems, and devices for wireless communications are described. The method may include monitoring a resource group of a sidelink channel for an indication of sidelink messaging traffic, determining a ratio of sidelink messaging traffic by a first radio access technology relative to sidelink messaging traffic by a second radio access technology based on the monitoring, selecting, based on the ratio, a first resource pattern of a set of multiple different resource patterns, and communicating, via the sidelink chan-
(Continued)

nel, a first sidelink message within a first resource of the resource group in accordance with the first resource pattern.

32 Claims, 15 Drawing Sheets

(56) References Cited

U.S. PATENT DOCUMENTS

| | | | | |
|---|---|---|---|---|
| 2021/0297314 | A1* | 9/2021 | Stefanatos | H04W 4/40 |
| 2021/0306885 | A1* | 9/2021 | Hou | H04W 24/10 |
| 2023/0018928 | A1* | 1/2023 | Luo | H04W 72/02 |

OTHER PUBLICATIONS

Garcia M.H.C., et al., "A Tutorial on 5G NR V2X Communications", in IEEE Communications Surveys and Tutorials, vol. 23, No. 3, Third Quarter, Arxiv.Org, Cornell University Library, 201 Olin Library Cornell University, Ithaca, NY 14853, Feb. 8, 2021, XP081877162, 55 Pages, p. 18-p. 21, figures 8, 10, 14, sections V.A.1), V.B, V.B.5), V.C.6), VI.B, VII.C, VIII.B, pp. 1972-2026.

International Search Report and Written Opinion—PCT/US2022/070604—ISA/EPO—May 18, 2022.

* cited by examiner

SIDELINK CHANNEL COEXISTENCE BY MULTIPLE RADIO ACCESS TECHNOLOGIES IN NON OVERLAPPING RESOURCES OF A RESOURCE GROUP

CROSS REFERENCES

The present Application is a 371 national stage filing of International PCT Application No. PCT/US2022/070604 by Nguyen et al. entitled "SIDELINK CHANNEL COEXISTENCE BY MULTIPLE RADIO ACCESS TECHNOLOGIES IN NON OVERLAPPING RESOURCES OF A RESOURCE GROUP," filed Feb. 10, 2022; and claims priority to International Patent Application No. 20210100150 by Nguyen et al. entitled "SIDELINK CHANNEL COEXISTENCE BY MULTIPLE RADIO ACCESS TECHNOLOGIES IN NON OVERLAPPING RESOURCES OF A RESOURCE GROUP," filed Mar. 11, 2021, each of which is assigned to the assignee hereof, and each of which is expressly incorporated by reference in its entirety herein.

FIELD OF TECHNOLOGY

The following relates to wireless communications, including sidelink channel coexistence of multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support sidelink channel coexistence of multiple radio access technologies. Multiple radio access technologies coexisting on the same sidelink channel may result in collisions with sidelink communications.

SUMMARY

The described techniques relate to improved methods, systems, devices, and apparatuses that support sidelink channel coexistence of multiple radio access technologies. Generally, the described techniques provide for a UE selecting a resource pattern (e.g., resource group pattern, resource pattern) from multiple resource patterns and communicating a sidelink message based on the selected resource pattern. The UE may monitor the resource group (e.g., pool of resources) of the sidelink channel to determine a ratio of sidelink messaging traffic by devices of a first radio access technology relative to sidelink messaging traffic by devices of a second radio access technology (e.g., 33% of resource group occupied by first radio access technology traffic and 67% of resource group occupied by second radio access technology). In some cases, the UE may select the resource pattern based on the ratio. In some cases, the UE may communicate, via the sidelink channel, a sidelink message within a resource of the resource group in accordance with the selected resource pattern.

A method for wireless communication at a first user equipment (UE) is described. The method may include monitoring a resource group of a sidelink channel for an indication of sidelink messaging traffic, determining a ratio of sidelink messaging traffic by a first radio access technology relative to sidelink messaging traffic by a second radio access technology based on the monitoring, selecting, based on the ratio, a first resource pattern of a set of multiple different resource patterns, and communicating, via the sidelink channel, a first sidelink message within a first resource of the resource group in accordance with the first resource pattern.

An apparatus for wireless communication at a first UE is described. The apparatus may include a processor, memory coupled with the processor, and instructions stored in the memory. The instructions may be executable by the processor to cause the apparatus to monitor a resource group of a sidelink channel for an indication of sidelink messaging traffic, determine a ratio of sidelink messaging traffic by a first radio access technology relative to sidelink messaging traffic by a second radio access technology based on the monitoring, select, based on the ratio, a first resource pattern of a set of multiple different resource patterns, and communicate, via the sidelink channel, a first sidelink message within a first resource of the resource group in accordance with the first resource pattern.

Another apparatus for wireless communication at a first UE is described. The apparatus may include means for monitoring a resource group of a sidelink channel for an indication of sidelink messaging traffic, means for determining a ratio of sidelink messaging traffic by a first radio access technology relative to sidelink messaging traffic by a second radio access technology based on the monitoring, means for selecting, based on the ratio, a first resource pattern of a set of multiple different resource patterns, and means for communicating, via the sidelink channel, a first sidelink message within a first resource of the resource group in accordance with the first resource pattern.

A non-transitory computer-readable medium storing code for wireless communication at a first UE is described. The code may include instructions executable by a processor to monitor a resource group of a sidelink channel for an indication of sidelink messaging traffic, determine a ratio of sidelink messaging traffic by a first radio access technology relative to sidelink messaging traffic by a second radio access technology based on the monitoring, select, based on the ratio, a first resource pattern of a set of multiple different resource patterns, and communicate, via the sidelink channel, a first sidelink message within a first resource of the resource group in accordance with the first resource pattern.

Some examples of the method, apparatuses, and non-transitory computer-readable medium described herein may further include operations, features, means, or instructions for transmitting or receiving, by the first UE operating in accordance with the first radio access technology, first control signaling indicating the first resource pattern to a second UE operating in accordance with the first radio access technology.

Some examples of the method, apparatuses, and non-transitory computer-readable medium described herein may further include operations, features, means, or instructions for receiving second control signaling indicating approval of the first resource pattern or indicating a second resource pattern that differs from the first resource pattern, where the selecting may be based on the second control signaling.

In some examples of the method, apparatuses, and non-transitory computer-readable medium described herein, monitoring the resource group may include operations, features, means, or instructions for receiving, from a second UE, sidelink control information indicating that the second UE operates in accordance with the first radio access technology.

In some examples of the method, apparatuses, and non-transitory computer-readable medium described herein, monitoring the resource group may include operations, features, means, or instructions for receiving, from a second UE, a control message indicating that the second UE operates in accordance with the first radio access technology.

In some examples of the method, apparatuses, and non-transitory computer-readable medium described herein, communicating the first sidelink message may include operations, features, means, or instructions for determining a first number of devices, including the second UE, that operate in accordance with the first radio access technology, and a second number of devices that operate in accordance with the second radio access technology, where the ratio may be determined based on the first number of devices and the second number of devices.

In some examples of the method, apparatuses, and non-transitory computer-readable medium described herein, communicating the first sidelink message may include operations, features, means, or instructions for communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

Some examples of the method, apparatuses, and non-transitory computer-readable medium described herein may further include operations, features, means, or instructions for transmitting, via the first radio access technology, a second sidelink message in a second resource of the resource group indicated by the first resource pattern to be allocated to the second radio access technology based on a priority of the second sidelink message.

In some examples of the method, apparatuses, and non-transitory computer-readable medium described herein, selecting the first resource pattern may include operations, features, means, or instructions for selecting the first resource pattern to allocate some or all resources of the resource group to the first radio access technology based on the ratio, where remaining resources may be allocated to the second radio access technology based on the ratio.

Some examples of the method, apparatuses, and non-transitory computer-readable medium described herein may further include operations, features, means, or instructions for transmitting or receiving a sidelink control channel signal of the second radio access technology in one or more transmission time intervals.

Some examples of the method, apparatuses, and non-transitory computer-readable medium described herein may further include operations, features, means, or instructions for transmitting or receiving control signaling indicating the set of multiple different resource patterns.

In some examples of the method, apparatuses, and non-transitory computer-readable medium described herein, monitoring the resource group may include operations, features, means, or instructions for determining a first number of decoded messages that may be of the first radio access technology, and a second number of decoded messages that may be of the second radio access technology, where the ratio may be determined based on the first number of decoded messages and the second number of decoded messages.

In some examples of the method, apparatuses, and non-transitory computer-readable medium described herein, monitoring the resource group may include operations, features, means, or instructions for monitoring the resource group to determine a first channel busy ratio for the first radio access technology, and a second channel busy ratio for the second radio access technology, where the ratio may be determined based on the first channel busy ratio and the second channel busy ratio.

Some examples of the method, apparatuses, and non-transitory computer-readable medium described herein may further include operations, features, means, or instructions for determining an updated ratio based on the monitoring and selecting a second resource pattern of the set of multiple different resource patterns based on the updated ratio.

In some examples of the method, apparatuses, and non-transitory computer-readable medium described herein, the set of multiple different resource patterns includes a set of multiple different time division multiplexing resource patterns.

In some examples of the method, apparatuses, and non-transitory computer-readable medium described herein, the first resource pattern includes a sidelink feedback channel that occurs periodically or semi-persistently.

In some examples of the method, apparatuses, and non-transitory computer-readable medium described herein, the first radio access technology includes a new radio (NR) radio access technology and the second radio access technology includes a long term evolution (LTE) radio access technology.

A method for wireless communication by a second UE is described. The method may include determining a ratio of sidelink messaging traffic by a first radio access technology relative to sidelink messaging traffic by a second radio access technology, receiving, from a first UE operating in accordance with the first radio access technology, control signaling indicating a first resource pattern of a set of multiple different resource patterns associated with a resource group of a sidelink channel, the second UE operating in accordance with the first radio access technology, and transmitting, based on the ratio, second control signaling indicating approval of the first resource pattern or indicating a second resource pattern that differs from the first resource pattern.

An apparatus for wireless communication by a second UE is described. The apparatus may include a processor, memory coupled with the processor, and instructions stored in the memory. The instructions may be executable by the processor to cause the apparatus to determine a ratio of sidelink messaging traffic by a first radio access technology relative to sidelink messaging traffic by a second radio access technology, receive, from a first UE operating in accordance with the first radio access technology, control signaling indicating a first resource pattern of a set of multiple different resource patterns associated with a resource group of a sidelink channel, the second UE operating in accordance with the first radio access technology, and transmit, based on the ratio, second control signaling indicating approval of the first resource pattern or indicating a second resource pattern that differs from the first resource pattern.

Another apparatus for wireless communication by a second UE is described. The apparatus may include means for determining a ratio of sidelink messaging traffic by a first radio access technology relative to sidelink messaging traffic by a second radio access technology, means for receiving, from a first UE operating in accordance with the first radio access technology, control signaling indicating a first resource pattern of a set of multiple different resource patterns associated with a resource group of a sidelink channel, the second UE operating in accordance with the first radio access technology, and means for transmitting, based on the ratio, second control signaling indicating approval of the first resource pattern or indicating a second resource pattern that differs from the first resource pattern.

A non-transitory computer-readable medium storing code for wireless communication by a second UE is described. The code may include instructions executable by a processor to determine a ratio of sidelink messaging traffic by a first radio access technology relative to sidelink messaging traffic by a second radio access technology, receive, from a first UE operating in accordance with the first radio access technology, control signaling indicating a first resource pattern of a set of multiple different resource patterns associated with a resource group of a sidelink channel, the second UE operating in accordance with the first radio access technology, and transmit, based on the ratio, second control signaling indicating approval of the first resource pattern or indicating a second resource pattern that differs from the first resource pattern.

Some examples of the method, apparatuses, and non-transitory computer-readable medium described herein may further include operations, features, means, or instructions for communicating, via the sidelink channel, a first sidelink message within a first resource of the resource group in accordance with the first resource pattern.

In some examples of the method, apparatuses, and non-transitory computer-readable medium described herein, the communicating may be based on the second control signaling.

Some examples of the method, apparatuses, and non-transitory computer-readable medium described herein may further include operations, features, means, or instructions for selecting the first resource pattern to allocate some or all resources of the resource group to the first radio access technology based on the ratio.

Some examples of the method, apparatuses, and non-transitory computer-readable medium described herein may further include operations, features, means, or instructions for communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

Some examples of the method, apparatuses, and non-transitory computer-readable medium described herein may further include operations, features, means, or instructions for receiving, via the first radio access technology, a second sidelink message in a second resource of the resource group indicated by the first resource pattern to be allocated to the second radio access technology based on a priority of the second sidelink message.

Some examples of the method, apparatuses, and non-transitory computer-readable medium described herein may further include operations, features, means, or instructions for transmitting, to the first UE, sidelink control information indicating that the second UE operates in accordance with the first radio access technology.

Some examples of the method, apparatuses, and non-transitory computer-readable medium described herein may further include operations, features, means, or instructions for transmitting, to the first UE, a control message indicating that the second UE operates in accordance with the first radio access technology.

Some examples of the method, apparatuses, and non-transitory computer-readable medium described herein may further include operations, features, means, or instructions for transmitting or receiving a sidelink control channel signal of the second radio access technology in one or more transmission time intervals.

Some examples of the method, apparatuses, and non-transitory computer-readable medium described herein may further include operations, features, means, or instructions for transmitting or receiving control signaling indicating the set of multiple different resource patterns.

A method for wireless communication at a base station is described. The method may include selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel and transmitting, to one or more UEs operating in accordance with the first radio access technology, control signaling indicating the first resource pattern.

An apparatus for wireless communication at a base station is described. The apparatus may include a processor, memory coupled with the processor, and instructions stored in the memory. The instructions may be executable by the processor to cause the apparatus to select, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel and transmit, to one or more UEs operating in accordance with the first radio access technology, control signaling indicating the first resource pattern.

Another apparatus for wireless communication at a base station is described. The apparatus may include means for selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel and means for transmitting, to one or more UEs operating in accordance with the first radio access technology, control signaling indicating the first resource pattern.

A non-transitory computer-readable medium storing code for wireless communication at a base station is described. The code may include instructions executable by a processor to select, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel and transmit, to one or more UEs operating in accordance with the first radio access technology, control signaling indicating the first resource pattern.

Some examples of the method, apparatuses, and non-transitory computer-readable medium described herein may further include operations, features, means, or instructions for receiving an indication of the first resource pattern from a first UE operating in accordance with the first radio access technology.

DETAILED DESCRIPTION

Figure 1:
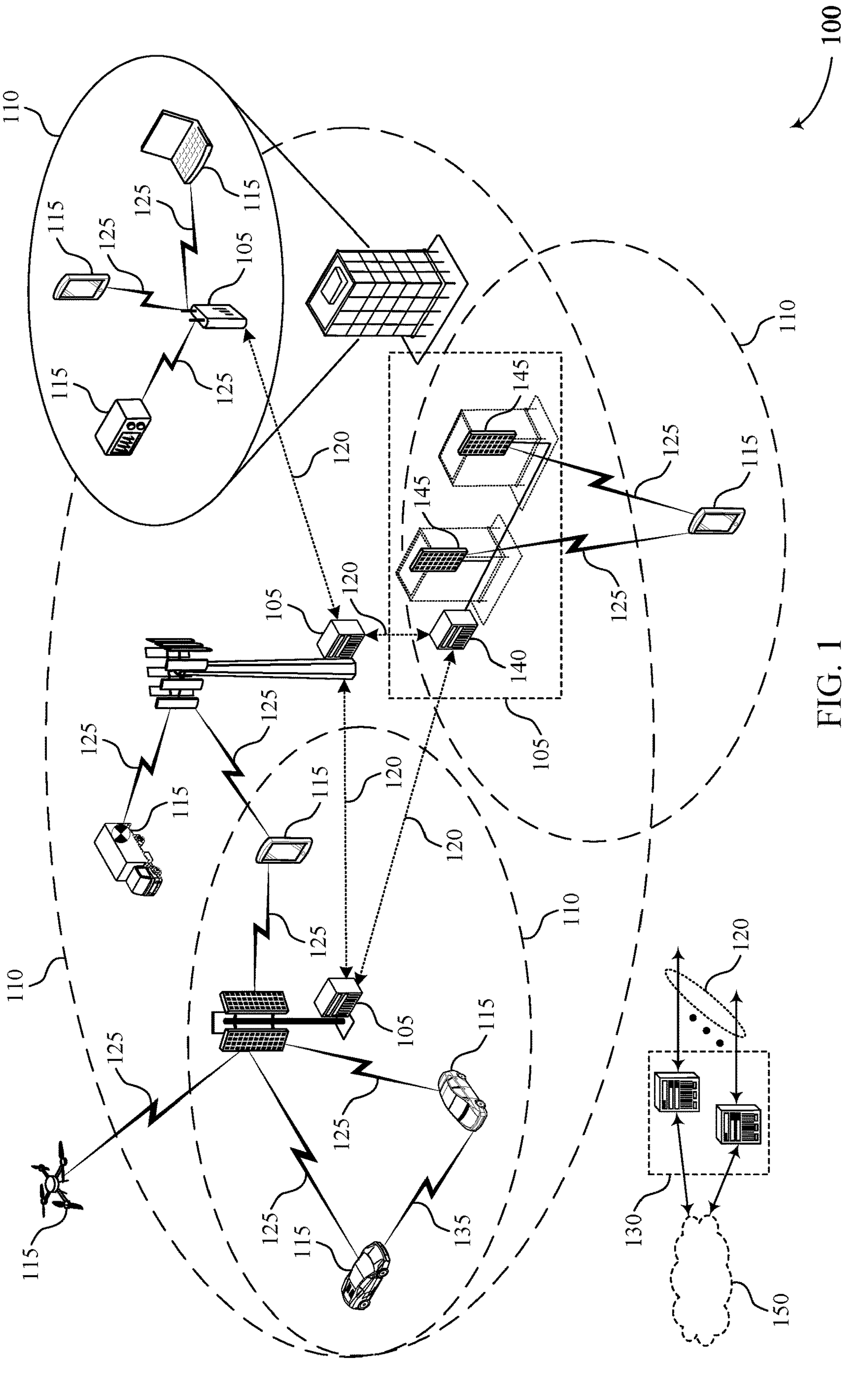
FIG. 1 illustrates an example of a wireless communications system that supports sidelink channel coexistence of multiple radio access technologies in accordance with aspects of the present disclosure.

The present techniques include sidelink channel coexistence of multiple radio access technologies. Cellular vehicle-to-everything (C-V2X) may include device-to-network (e.g., vehicle-to-network (V2N)) communication between a device and a network, and device-to-device (e.g., vehicle-to-vehicle (V2V), sidelink communications), etc. In some cases, a V2X system may include multiple radio access technologies (e.g., LTE and NR). In some cases, an NR V2X device and a LTE V2X device may operate (e.g., coexist) in the same channel due to a scarcity of available spectrum. Lacking coordination, NR V2X transmissions may collide with LTE V2X transmissions. As a result, the performance and reliability of both systems may suffer, resulting in a poor user experience. The present techniques provide techniques to reduce collisions in sidelink communications when multiple radio access technologies coexist on the same sidelink channel.

The present techniques split resources of a sidelink channel between NR V2X and LTE V2X devices based on a ratio of NR V2X and LTE V2X sidelink transmissions within a resource group, thereby reducing or avoiding collisions between the different sidelink traffic types. An NR V2X device may select a resource pattern (e.g., time domain multiplexing pattern), or frequency domain multiplexing pattern, or a combination thereof) multiple resource patterns. In some cases, the NR V2X device may select the resource pattern based on the ratio. Based on the selected resource pattern, the techniques may include an NR V2X device accessing a sidelink channel in a first set of time slots of the resource pattern, and a LTE V2X device accessing the sidelink channel in a second set of time slots of the resource pattern. In some cases, NR V2X devices may determine a percentage of all the resources in a resource group of the sidelink channel currently being used by NR V2X devices (e.g., 30% NR V2X ratio) and determine a percentage of all the resources in a resource group of the sidelink channel currently being used by LTE V2X devices (e.g., 70% LTE V2X ratio). In some cases, NR V2X devices may configure resource usage based on the NR V2X ratio (e.g., use a first resource pattern when NR V2X ratio is at 30%, use a second resource pattern when NR V2X ratio is at 40%, etc.). In some cases, NR V2X devices may modify the resource usage (e.g., switch from a second resource pattern to a third resource pattern, etc.) as an NR V2X resource usage ratio increases or decreases over time. It is noted that the techniques discussed herein are with reference to two different radio access technologies, and the techniques may be extended to any desired number of different radio access technologies.

The present techniques reduce the likelihood of collisions when NR V2X devices and LTE V2X devices operate in the same channel. The described techniques increase system efficiency and reduce power consumption, freeing up processing cycles of one or more devices (e.g., battery-operated devices, such as UEs, NR V2X devices, LTE V2X devices, etc.). Additionally, described techniques result in avoiding multiple retransmissions and failed transmissions, decreasing system latency, improving the reliability, thus improving user experience.

Aspects of the disclosure are initially described in the context of wireless communications systems. Aspects of the disclosure are further illustrated by and described with reference to an exemplary wireless communications system and process flow that relate to sidelink channel coexistence of multiple radio access technologies. Aspects of the disclosure are further illustrated by and described with reference to apparatus diagrams, system diagrams, and flowcharts that relate to sidelink channel coexistence of multiple radio access technologies.

FIG. 1 illustrates an example of a wireless communications system 100 that supports sidelink channel coexistence of multiple radio access technologies in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a UE 115 may select a resource pattern from multiple resource patterns and communicate a sidelink message based on the selected resource pattern. The UE 115 may operate an NR V2X radio access technology that may estimate a penetration rate of NR V2X UEs relative to LTE V2X UEs in a sidelink channel that may be expressed as a ratio. The UE 115 may monitor the resource group (e.g., resource pool) of the sidelink channel to determine a ratio of sidelink messaging traffic by devices of a first radio access technology relative to sidelink messaging traffic by devices of a second radio access technology (e.g., 42% of resource group occupied by first radio access technology traffic and 58% of resource group occupied by second radio access technology). In some cases, the UE 115 may select the resource pattern based on the ratio (e.g., select a first resource pattern based on a first ratio value or the first ratio value being within a first range of ratio values, select a second resource pattern based on a second ratio value or the second ratio value being within a second range of ratio values, etc.). In some cases, the UE 115 may communicate, via the sidelink channel, a sidelink message within a resource of the resource group in accordance with the selected resource pattern. In some cases, the multiple resource patterns, including the selected resource pattern, may indicate timing configurations for one or more time domain resources of the resource group, or one or more frequency configurations for one or more frequency domain resources, or any combination thereof.

Figure 2:
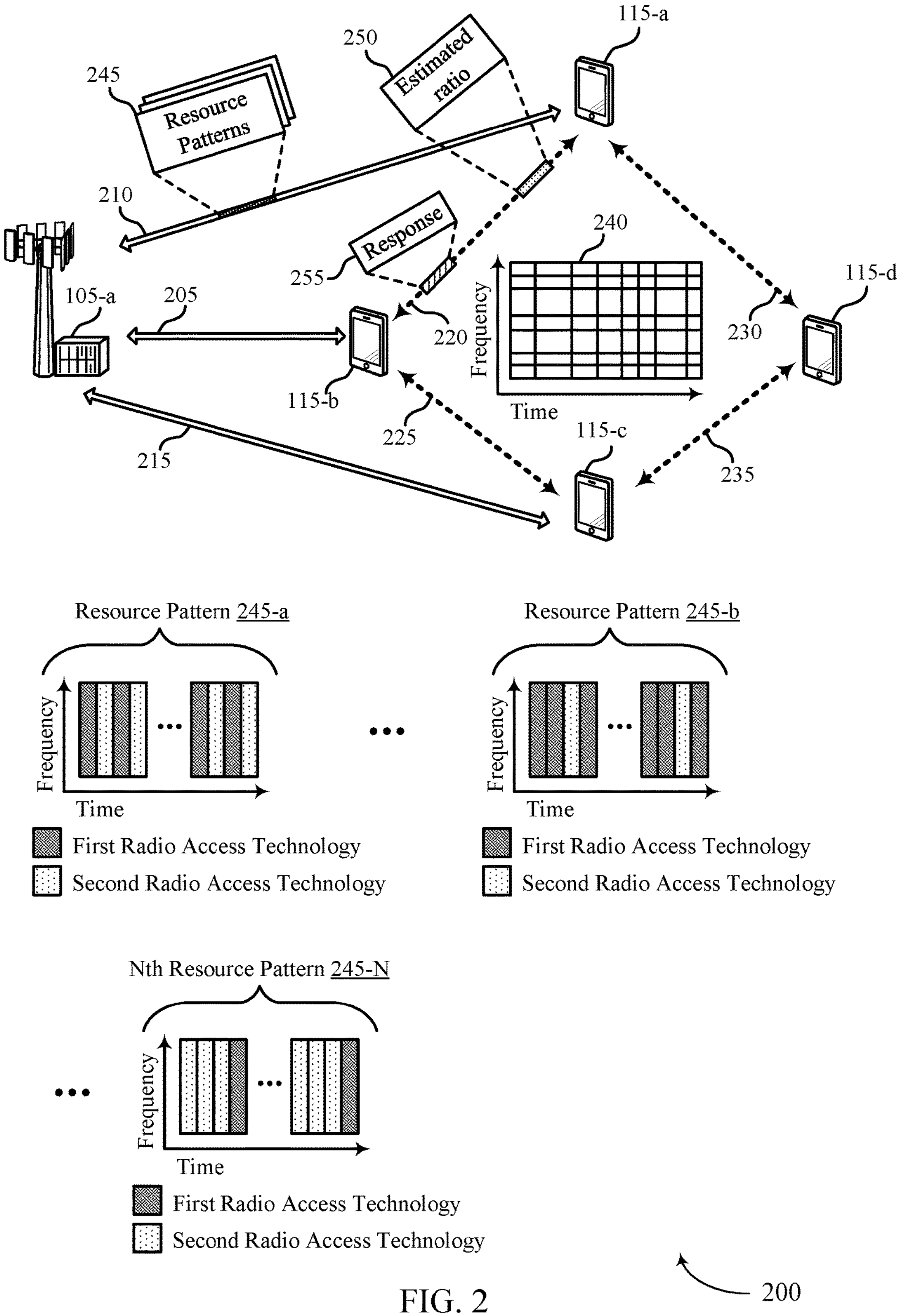
FIG. 2 illustrates an example of a wireless communications system that supports sidelink channel coexistence of multiple radio access technologies in accordance with aspects of the present disclosure.

FIG. 2 illustrates an example of a wireless communications system 200 that supports sidelink channel coexistence of multiple radio access technologies in accordance with aspects of the present disclosure.

In the illustrated example, wireless communications system 200 may implement one or more aspects of wireless communications system 100. As illustrated, wireless communications system 200 may include UE 115-*b*, UE 115-*b*, UE 115-*c*, UE 115-*d*, and base station 105-*a*, any of which may be an example of a UE 115 or a base station 105, respectively, as described herein with reference to FIG. 1.

Wireless communications system 200 may also include a direct link 205 between base station 105-*a* and UE 115-*b*, a direct link 210 between base station 105-*a* and UE 115-*a*, and direct link 215 between base station 105-*a* and UE 115-*c*. Wireless communications system 200 may also include a sidelink 220 between UE 115-*a* and UE 115-*b*, a sidelink 225 between UE 115-*b* and UE 115-*c*, a sidelink 230 between UE 115-*a* and UE 115-*d*, and a sidelink 235 between UE 115-*c* and UE 115-*d*.

In some examples, UE 115-*b* may operate in accordance with a first radio access technology (e.g., NR, 5G, etc.). In some cases, UE 115-*b* may operate in accordance with the first radio access technology and a second access technology (e.g., LTE). In some cases, UE 115-*a* may operate in accordance with the first radio access technology, or the second radio access technology, or the first radio access technology and the second radio access technology. In some cases, UE 115-*c* may operate in accordance with the first radio access technology, or the second radio access technology, or the first radio access technology and the second radio access technology. In some cases, UE 115-*d* may operate in accordance with the first radio access technology, or the second radio access technology, or the first radio access technology and the second radio access technology.

In some examples, base station 105-*a* may transmit (e.g., broadcast, unicast, etc.) the resource patterns 245 (e.g., N resource patterns, where N is a positive integer between 1 and the number of configured resource patterns) to at least one of UE 115-*b*, UE 115-*a*, UE 115-*c*, and UE 115-*d*. As shown, base station 105-*a* may transmit one or more of the resource patterns 245 at least to UE 115-*a*. In some cases, the resource patterns 245 may include first resource pattern 245-*a*, second resource pattern 245-*b*, up to Nth resource pattern 245-N. In the illustrated example, first resource pattern 245-*a* may be configured where every other slot or subframe alternates between the first radio access technology and the second radio access technology (e.g., a first slot/subframe allocated to the first radio access technology, a second slot/subframe allocated to the second radio access technology, etc.). In the illustrated example, second resource pattern 245-*b* may be configured where every third slot/subframe is allocated to the second radio access technology (e.g., a first slot/subframe and second slot/subframe allocated to the first radio access technology, and a third slot/subframe allocated to the second radio access technology, etc.). In the illustrated example, Nth resource pattern 245-N may be configured where every fourth slot/subframe is allocated to the first radio access technology (e.g., a first slot/subframe, second slot/subframe, and third slot/subframe allocated to the second radio access technology, and a fourth slot/subframe allocated to the first radio access technology, etc.).

In some examples, one or more UEs (e.g., at least UE 115-*a*) may monitor resource group 240. In some cases, the resource group 240 may include a set of TTIs, where a TTI may be a slot or a subframe. In some cases, the discussion herein may describe examples of resource groups (e.g., resource group 240) as including slots, subframes, or other TTIs, that may be split between devices operating in accordance with the first radio access technology (e.g., NR V2X UEs) and devices operating in accordance with the second radio access technology (e.g., LTE V2X UEs) based on an estimated ratio.

In some examples, UE 115-*a* may monitor communications associated with resource group 240 for an indication of sidelink messaging traffic. In some cases, UE 115-*a* may determine an estimated ratio of sidelink messaging traffic associated with the first radio access technology relative to sidelink messaging traffic associated with the second radio access technology. In some cases, resource group 240 may be associated with one or more sidelink channels. Resource group 240 may include a pool of resources used in association with sidelink communications. Resource group 240 may include resources that respective UEs 115 may use to communicate over sidelink 220, sidelink 225, sidelink 230, and sidelink 235. Resource group 240 may be associated with time resources or frequency resources, or both, associated with the one or more sidelink channels.

In some cases, one or more UEs (e.g., at least UE 115-*a*) operating in accordance with the first radio access technology (e.g., NR) may transmit one or more basic safety messages (BSMs) over the second radio access technology (e.g., LTE). In some cases, the one or more UEs may set a reserved bit of the control portion of the LTE transmission to a predetermined binary value (e.g., 1 or 0) to indicate that the transmission is from a device operating in accordance with or otherwise supports communication using the first radio access technology. In some cases, the one or more UEs may transmit in the data portion of the LTE transmission a MAC-CE message to indicate that the transmission is from a device operating in accordance with or otherwise supports communication using the first radio access technology. In some cases, UE 115-*a* may determine estimated ratio 250 based on a LTE transmission with the reserved bit of the control portion set to the predetermined binary value, or the LTE transmission received with MAC-CE messages, or both. In some cases, UE 115-*a* may transmit BSM, cooperative awareness message (CAM) packets, or both, on an LTE V2X radio access technology, and may transmit sensor sharing traffic or other traffic on an NR V2X radio access technology.

In some examples, when UE 115-*a* determines estimated ratio 250 reaches 100% (e.g., 100% of the resources of resource group 240 are being used by devices operating in accordance with the first radio access technology), UE 115-*a* may transmit BSMs/CAMs via the first radio access technology instead of the second radio access technology. In some cases, when UE 115-*a* determines 100% of the resources of resource group 240 are being used by devices operating in accordance with the first radio access technology, UE 115-*a* may stop any communication via the second radio access technology. For example, when the penetration rate approaches or reaches 100%, BSM/CAM transmission may be switched to NR V2X, and LTE V2X may be turned off completely.

In some examples, UE 115-*a* may operate according to an NR V2X radio access technology and may estimate LTE V2X density, NR V2X density, or both. The UE 115-*a* may determine a first number of devices that operate in accordance with the first radio access technology, and a second number of devices that operate in accordance with the second radio access technology, where the estimated ratio 250 is determined based on the first number of devices and the second number of devices. In some examples, UE 115-*a* may determine a first number of decoded control messages, decoded data messages, or both, that are of the first radio access technology, and a second number of decoded control messages, decoded data messages, or both, that are of the second radio access technology, where the estimated ratio 250 is determined based on the first number and the second number (e.g., a ratio of the first number and the second number). In some cases, UE 115-0 may monitor the resource group 240 to determine a first channel busy ratio for the first radio access technology, and a second channel busy ratio for the second radio access technology, where the estimated ratio 250 is determined based on the first channel busy ratio and the second channel busy ratio (e.g., a ratio of the first number and the second number).

In some examples, UE 115-*a* may select a resource pattern based on the estimated ratio (e.g., estimated penetration rate). In some cases, UE 115-*a* may select first resource pattern 245-*a* based on the estimated ratio being within a first range (e.g., estimated ratio 250 at or within a range of 50%). In some cases, UE 115-*a* may select second resource pattern 245-*b* based on the estimated ratio being within a second range (e.g., estimated ratio 250 at or within a range of 67% for NR devices/traffic, or estimated ratio 250 at or within a range of 33% for LTE devices/traffic). In some cases, UE 115-*a* may select Nth resource pattern 245-N based on the estimated ratio being within an Nth range (e.g., estimated ratio 250 at or within a range of 25% for NR devices/traffic, or estimated ratio 250 at or within a range of 75% for LTE devices/traffic).

In the illustrated example, resource patterns 245 may provide time division multiplexing (TDM) between devices operating in accordance with the first radio access technology (e.g., NR V2X UEs) and devices operating in accordance with the second radio access technology (e.g., LTE V2X UEs). In some cases, resource patterns 245 may provide for frequency division multiplexing (FDM) between devices operating in accordance with the first radio access technology (e.g., NR V2X UEs) and devices operating in accordance with the second radio access technology (e.g., LTE V2X UEs). In some cases, one or more resource patterns of resource patterns 245 may allocate a first set of one or more resource blocks to NR V2X UEs and allocate a second set of one or more resource blocks to LTE V2X UEs. For example, the resource pattern may indicate that at least one slot of a resource group may have a first set of one or more resource blocks for NR V2X UEs and a second set of one or more resource blocks for LTE V2X UEs in a same slot. Thus, NR V2X UEs and LTE V2X UEs may communicate in different resource blocks of a same slot in accordance with the resource pattern.

In some cases, the selected resource pattern may be one of multiple different resource patterns of resource pattern 245. In some cases, UE 115-*a* may transmit its estimated ratio (e.g., estimated ratio 250 transmitted via control signaling) at least to UE 115-*b* to align which resource pattern is being used (e.g., align on a same time division multiplexing pattern). In some cases, UE 115-*a* may transmit (e.g., broadcast) its estimated ratio to devices operating in accordance with the first radio access technology.

In some examples, UE 115-*b* may select a resource pattern based on a ratio estimated by UE 115-*b*. In some cases, UE 115-*b* may receive estimated ratio 250 from UE 115-*a*. In some cases, UE 115-*b* may compare its estimated ratio to the estimated ratio 250 receives from UE 115-*a*. In some cases, UE 115-*b* may transmit response 255 (e.g., via control signaling) to UE 115-*a* based on receiving estimated ratio 250 from UE 115-*a* or based on comparing the estimated ratios, or both. In some cases, response 255 may include an indication of approval of estimated ratio 250 or an adjustment to estimated ratio 250. In some cases, UE 115-*a* may select a resource pattern based on response 255 (e.g., based on the approval of estimated ratio 250 or the adjustment to estimated ratio 250, received from UE 115-*b*). In some cases, UE 115-*a* may select a resource pattern based on a location of a UE relative to a location of UE 115-*a* (e.g., based on a location of UE 115-*b*, or location of UE 115-*c*, or location of UE 115-*d*, or a combination thereof, relative to a location of UE 115-*a*). In some cases, UE 115-*a* may determine that a first UE (e.g., UE 115-*b*) is nearer to UE 115-*a* than a second UE (e.g., UE 115-*d*). In some cases, UE 115-*a* may select a resource pattern associated with the first UE based on UE 115-*a* giving more weight to the first UE in accordance with the first UE being nearer to UE 115-*a* than the second UE.

In some examples, UE 115-*a* periodically or continuously monitor the resource group 240 and periodically or continually update the estimated ratio 250. In some cases, UE 115-*a* may determine an updated ratio based on the monitoring and select a second resource pattern of the resource patterns 245 based the updated ratio.

In some examples, a selected resource pattern (e.g., the resource pattern selected by UE 115-*a*) may be dynamically updated and change over time. In some cases, the selected resource pattern may be dynamically updated based on the estimation of the ratio changing over time. In some cases, UE 115-*a* may estimate a first instance of an estimated ratio (e.g., estimated ratio 250) at a first time. The UE 115-*a* may select a dynamic resource pattern based on the first instance of the estimated ratio at the first time. At a second time, UE 115-*a* may determine a second instance of the estimated ratio (e.g., 35% of resources being used by devices operating in accordance with the first radio access technology) that is different from the first instance of the estimated ratio (e.g., 33% of resources being used by devices operating in accordance with the first radio access technology). In some cases, UE 115-*a* may dynamically update the dynamic resource pattern based on the second instance of the estimated ratio, or based on a difference between the first instance of the estimated ratio and the second instance of the estimated ratio.

In some examples, UE 115-*a* may select a first resource pattern based on the ratio estimated by UE 115-*a*. In some cases, UE 115-*a* may transmit the first resource pattern (e.g., transmitted via control signaling) at least to UE 115-*b* to align which resource pattern is being used (e.g., align on a same time division multiplexing pattern). In some cases, UE 115-*a* may transmit (e.g., broadcast) the first resource pattern to devices operating in accordance with the first radio access technology.

In some examples, UE 115-*b* may receive resource patterns 245 from base station 105-*a* (e.g., via direct link 205) or from a UE (e.g., UE 115-*a* via sidelink 220). In some cases, UE 115-*b* may select a second resource pattern based on a ratio estimated by UE 115-*b*. In some cases, the second resource pattern selected by UE 115-*b* may match the first resource pattern of UE 115-*a*. In some cases, the second resource pattern may be a different resource pattern than the first resource pattern selected by UE 115-*a*. In some cases, UE 115-*b* may select a second resource pattern based on the resource pattern selected by UE 115-*a*. In some cases, UE 115-*b* may receive the first resource pattern from UE 115-*a*. In some cases, UE 115-*b* may compare the first resource pattern of UE 115-*a* to the second resource pattern selected by UE 115-*b*. In some cases, UE 115-*b* may transmit response 255 (e.g., via control signaling) to UE 115-*a* based on receiving the resource pattern selected by UE 115-*a* or based on comparing the respective resource patterns, or both. In some cases, response 255 may include an indication of approval of the first resource pattern selected by UE 115-*a* or may indicate a second resource pattern that differs from the first resource pattern. In some cases, UE 115-*a* may select a resource pattern based on the response 255 (e.g., based on the approval of the first resource pattern or the second resource pattern received from UE 115-*b*).

In some examples, base station 105-*a* may receive a ratio (e.g., estimated ratio 250) via a direct link (e.g., via direct link 205, 210, or 215, etc.). In some cases, base station 105-*a* may select a resource pattern based on the ratio. In some cases, base station 105-*a* may transmit control signaling to one or more UEs operating in accordance with the first radio access technology (e.g., UE 115-*a*, or UE 115-*b*, or UE 115-*c*, etc.) that indicates the resource pattern selected by base station 105-*a*.

In some examples, UE 115-*a* or base station 105-*a*, or both, may select a resource pattern that switches relatively often between available times slots for the first radio access technology and available time slots for the second radio access technology (e.g., where a gap between two NR transmissions may be 32 slots, and a gap between two LTE transmissions may be 16 slots). For example, a long gap in a TDM pattern between slots for a particular radio access technology may reduce a probability of the particular radio access technology finding retransmission resources, and may be avoided. For example, a TDM pattern of 1010101010101010 is better than 1111111100000000, where 1's represent resources in a resource group allocated for a first radio access technology and 0's represent resources in the resource group allocated for a second radio access technology.

In some cases, any selected resource pattern may include one or more slots for a sidelink feedback channel (e.g., a physical sidelink feedback channel (PSFCH)) that occurs periodically or semi-persistently regardless of the ratio for which the resource pattern was selected. In some examples, NR V2X may have a PSFCH resource available once every some number of slots/subframes (e.g., once every 2 or 4 slots/subframes, etc.), and a selected resource pattern may include one or more slots/subframes containing NR V2X PSFCH resources, in some examples regardless of the determined ratio (e.g., regardless of the NR V2X penetration rate)

In some cases, the selected resource pattern may enable a device operating in accordance with the first radio access technology priority over a device operating in accordance with the second radio access technology, while avoiding collisions between communications of the two radio access technologies. In some cases, the selected resource pattern may under-allocate resources for devices operating in accordance with the first radio access technology to allow these devices to prioritize resources over devices operating in accordance with the second radio access technology. In some cases, the selected resource pattern may be configured so that resources associated with devices operating in accordance with the second radio access technology do not include slots for a sidelink feedback channel. For example, the base station 105-*a* may transmit control signaling (e.g., RRC signaling, or an RRC reconfiguration message, or system information block, or MAC-CE, or a combination thereof) to configure the UEs 115 to operate using a resource pattern where LTE V2X resources within the resource pattern do not contain any NR V2X feedback slots (e.g., PSFCH slots).

In some examples, one or more resource patterns of resource patterns 245 may provide for soft pool restriction where an NR V2X UE (e.g., UE 115-*a*) may prioritize using a resource in the resource pattern of the NR V2X UE. In some cases, the NR V2X UE may be permitted to use a resource outside of the resource pattern of the NR V2X UE (e.g., when the NR V2X UE cannot find resources for retransmission, for high priority traffic, etc.). Using a resource outside of the resource pattern of the NR V2X UE may be subject to avoiding a collision with known LTE V2X transmissions. In some cases, soft pool restriction may provide for under allocating a resource pattern for the NR V2X UE (e.g., to better protect LTE V2X resources).

In some examples, UE 115-*a*, operating in accordance with the first radio access technology, may communicate, via sidelink 220 or sidelink 230, a sidelink message within a first resource (e.g., a first time slot) of the resource pool in accordance with the selected resource pattern (e.g., the first resource pattern or the second resource pattern). In some examples, UE 115-*b* may communicate, via sidelink 220 or sidelink 225, a sidelink message within a second resource (e.g., a second time slot) of the resource pool in accordance with the selected resource pattern. In some cases, UE 115-*d*, operating in accordance with the second radio access technology, may communicate via sidelink 230 or sidelink 235, a sidelink message within a third resource (e.g., a third time slot) of the resource pool.

In some examples, a device operating in accordance with the second radio access technology (e.g., LTE UE 115-*d*) may measure a signal strength (e.g., received signal strength indicator) associated with a first slot of resource group 240 and determine that the measured signal strength indicates that first slot is occupied. The device operating in accordance with the second radio access technology (e.g., an NR UE) may measure a signal strength associated with a second slot of resource group 240 and determine that the measure signal strength indicates that second slot is not occupied. Accordingly, the device may attempt to reserve the second slot, while avoiding using the first slot. As such, LTE V2X UEs may measure high RSSI at resources at subframes occupied by NR V2X UEs, and hence RSSI based resource ranking will cause resource selection LTE V2X UEs that moves away from NR V2X slots and instead selects the LTE V2X slots in the resource pattern.

In some examples, a device operating in accordance with the first radio access technology (e.g., NR UE 115-*a*) may transmit a message via a physical control channel (e.g., transmit an LTE V2X physical sidelink control channel (PSCCH) signal) to reserve resources in a first slot allocated by the resource pattern to the first radio access technology (e.g., to block a device operating in accordance with the second radio access technology (e.g., an LTE UE) from using that slot). Thus, an LTE UE performing sensing in the first slot may determine that the first slot is occupied, and may avoid selecting that slot for LTE V2X communication. Conversely, the NR UE 115-*a* may skip transmitting an LTE V2X PSCCH signal in a second slot allocated by the resource pattern to the second radio access technology (e.g., allocated to LTE V2X). Thus, an LTE UE performing sensing in the second slot is more likely to determine that the second slot is not occupied, and may is more likely to select that slot for LTE V2X communication. In some examples, the PSCCH may occur at a first available resource block to NR V2X in a slot or the PSCCH may be located at a start of transmitting bandwidth, the NR UE 115 may at least be able to block a portion of a subframe.

The present techniques may reduce power consumption and free up processing cycles of one or more devices (e.g., battery-operated devices, UE 115 of FIG. 1 or FIG. 2, etc.) by providing techniques for selecting a resource pattern in accordance with an estimated ratio of sidelink messaging traffic associated with the first radio access technology relative to sidelink messaging traffic associated with the second radio access technology, thus improving user experience of the one or more devices with a reduction of collisions, longer battery life, and improved quality of service.

Figure 3:
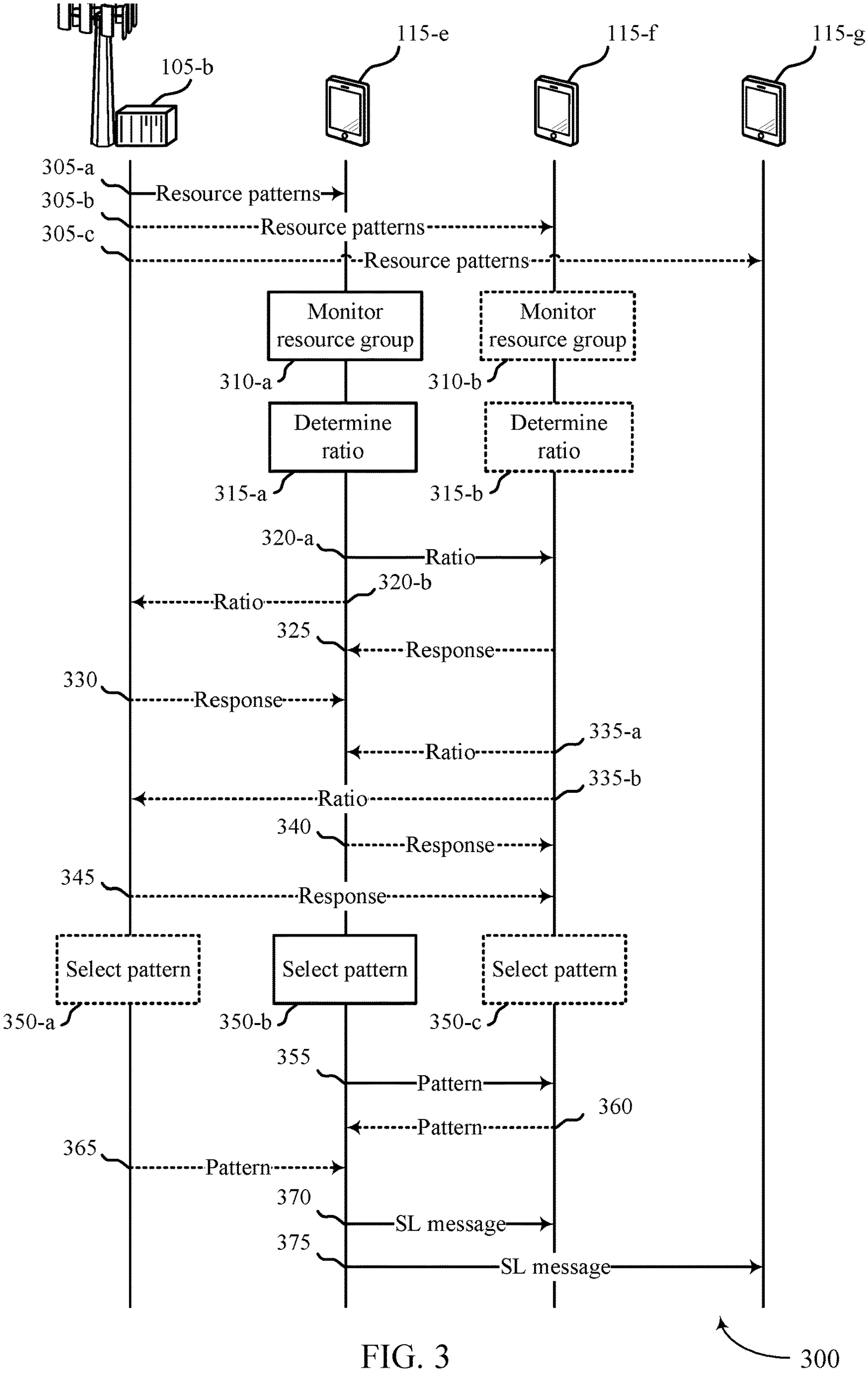
FIG. 3 illustrates an example of a process flow that supports sidelink channel coexistence of multiple radio access technologies in accordance with aspects of the present disclosure.

FIG. 3 illustrates an example of a process flow 300 that supports sidelink channel coexistence of multiple radio access technologies in accordance with aspects of the present disclosure.

In the illustrated example, process flow 300 may include base station 105-*b*, UE 115-*e*, UE 115-*f*, and UE 115-*g*. In some examples, UE 115-*e* and UE 115-*f* may be configured to operate in accordance with a first radio access technology (e.g., NR, 5G). In the illustrated example, UE 115-*g* operates in accordance with a second radio access technology different from the first radio access technology (e.g., LTE). In some cases, at least UE 115-*e* may use resources from a resource group of a sidelink channel to transmit or receive a sidelink message with one or more other of the UEs 115.

At 305, base station 105-*b* may transmit a set of resource patterns at least to UE 115-*e*. In some cases, base station 105-*b* may optionally transmit the resource patterns to UE 115-*f* or UE 115-*g*, or both. In some cases, base station 105-*b* may broadcast the resource patterns to one or more UEs.

At 310, UE 115-*e* may monitor the resource group of the sidelink channel for an indication of sidelink messaging traffic. In some cases, UE 115-*e* may receive or intercept, from UE 115-*f*, a message (e.g., a control message, MAC control element message, sidelink control information message, etc.) that indicates UE 115-*f* operates in accordance with the first radio access technology. In some cases, UE 115-*f* may receive or intercept a message from UE 115-*e* that indicates UE 115-*e* operates in accordance with the first radio access technology. In some cases, UE 115-*e* may receive, from UE 115-g, a message that indicates UE 115-*g* operates in accordance with the second radio access technology. In some cases, UE 115-*f* may optionally monitor the resource group of the sidelink channel for an indication of sidelink messaging traffic.

At 315, UE 115-*e* may determine a first ratio of sidelink messaging traffic by the first radio access technology relative to sidelink messaging traffic by the second radio access technology based on the monitoring. In some cases, UE 115-*e* may determine the first ratio of sidelink messaging traffic based on a device count of an estimated number of devices operating in accordance with the first radio access technology relative to an estimated number of devices operating in accordance with the second radio access technology. In some cases, UE 115-*e* may determine the first ratio of sidelink messaging traffic based on a decoded message count of the number of messages associated with the first radio access technology relative that are successfully decoded to a decoded message count of the number of messages associated with the second radio access technology that are successfully decoded. In some cases, UE 115-*e* may determine the first ratio of sidelink messaging traffic based on an estimated density of devices operating in accordance with the first radio access technology relative to an estimated density of devices operating in accordance with the second radio access technology. In some cases, UE 115-*e* may determine the first ratio of sidelink messaging traffic based on a channel busy ratio associated with devices operating in accordance with the first radio access technology relative to a channel busy ratio associated with devices operating in accordance with the second radio access technology. In some cases, UE 115-*f* may optionally determine a second ratio of sidelink messaging traffic by the first radio access technology relative to sidelink messaging traffic by the second radio access technology based on the monitoring by UE 115-*f*. In some cases, the second ratio may equal or differ from the first ratio.

At 320, UE 115-*e* may transmit the first ratio to UE 115-*f*. In some cases, UE 115-*e* may transmit the first ratio to base station 105-*b*.

At 325, UE 115-*f* may optionally transmit a response to UE 115-*e* based on receiving the first ratio from UE 115-*e*. In some cases, the response may include an approval of the first ratio or indicate the second ratio. In some cases, UE 115-*f* may transmit the second ratio when the second ratio differs from the first ratio.

At 330, base station 105-*b* may optionally transmit a response to UE 115-*e* based on base station 105-*b* receiving the first ratio from UE 115-*e*. In some cases, the response may include an approval of the first ratio or indicate a third ratio different from the first ratio.

At 335, UE 115-*e* may optionally transmit the second ratio to UE 115-*e* or to base station 105-*b*, or to both.

At 340, UE 115-*e* may optionally transmit a response to UE 115-*f* based on receiving the second ratio from UE 115-*f*. In some cases, the response may include an approval of the second ratio, or indicate the first ratio, or indicate an updated ratio determined by UE 115-*e* after determining the first ratio at 315. In some cases, UE 115-*e* may transmit the first ratio or the updated ratio when the second ratio differs from the first ratio or the updated ratio.

At 345, base station 105-*b* may optionally transmit a response to UE 115-*f* based on base station 105-*b* receiving the second ratio from UE 115-*f*. In some cases, the response may include an approval of the second ratio or indicate a fourth ratio different from the second ratio.

At 350, UE 115-*e* may select a first resource pattern of a plurality of different resource patterns. In some cases, UE 115-*e* may select the first resource pattern based on the first ratio. In some cases, UE 115-*e* may select the first resource pattern based on the response received from UE 115-*f* at 325. In some cases, UE 115-*e* may select the first resource pattern based on the response received from base station 105-*b* at 330. In some cases, UE 115-*f* may optionally select a second resource pattern based on the second ratio, or based on the first ratio received from UE 115-*e* at 320, or based on the response received from UE 115-*e* at 340, or based on the response received from base station 105-*b* at 345, or any combination thereof. In some cases, base station 105-*b* may optionally select a third resource pattern based on the first ratio received from UE 115-*e* at 320, or based on the second ratio received from UE 115-*f* at 335, or any combination thereof.

At 355, UE 115-*e* may transmit the first resource pattern to UE 115-*f*. In some cases, UE 115-*e* may transmit the first resource pattern to base station 105-*b*.

At 360, UE 115-*e* may transmit the second resource pattern to UE 115-*e*. In some cases, UE 115-*f* may transmit the second resource pattern to base station 105-*b*.

At 365, base station 105-*b* may transmit the third resource pattern to UE 115-*e*. In some cases, base station 105-*b* may transmit the third resource pattern to UE 115-*f*.

At 370, UE 115-*e* may communicate to UE 115-*f* a first sidelink message within a first resource of the resource group in accordance with the resource pattern selected by UE 115-*e* (e.g., the first resource pattern). In some cases, UE 115-*e* may communicate, via the first radio access technology, the first sidelink message in a first portion of one or more resource blocks of the resource group allocated to the first radio access technology during a transmission time interval in accordance with the first resource pattern. In some cases, a second portion of one or more resource blocks of the resource group may be allocated to the second radio access technology.

At 375, UE 115-*e* may communicate to UE 115-*f* a second sidelink message within a second resource of the resource group in accordance with the resource pattern selected by UE 115-*e*. In some examples, based on a priority of the second sidelink message, UE 115-*a* may transmit, via the first radio access technology (e.g., NR), the second sidelink message in a second resource of the resource group indicated by the first resource pattern that is allocated to the second radio access technology (e.g., LTE).

Figure 4:
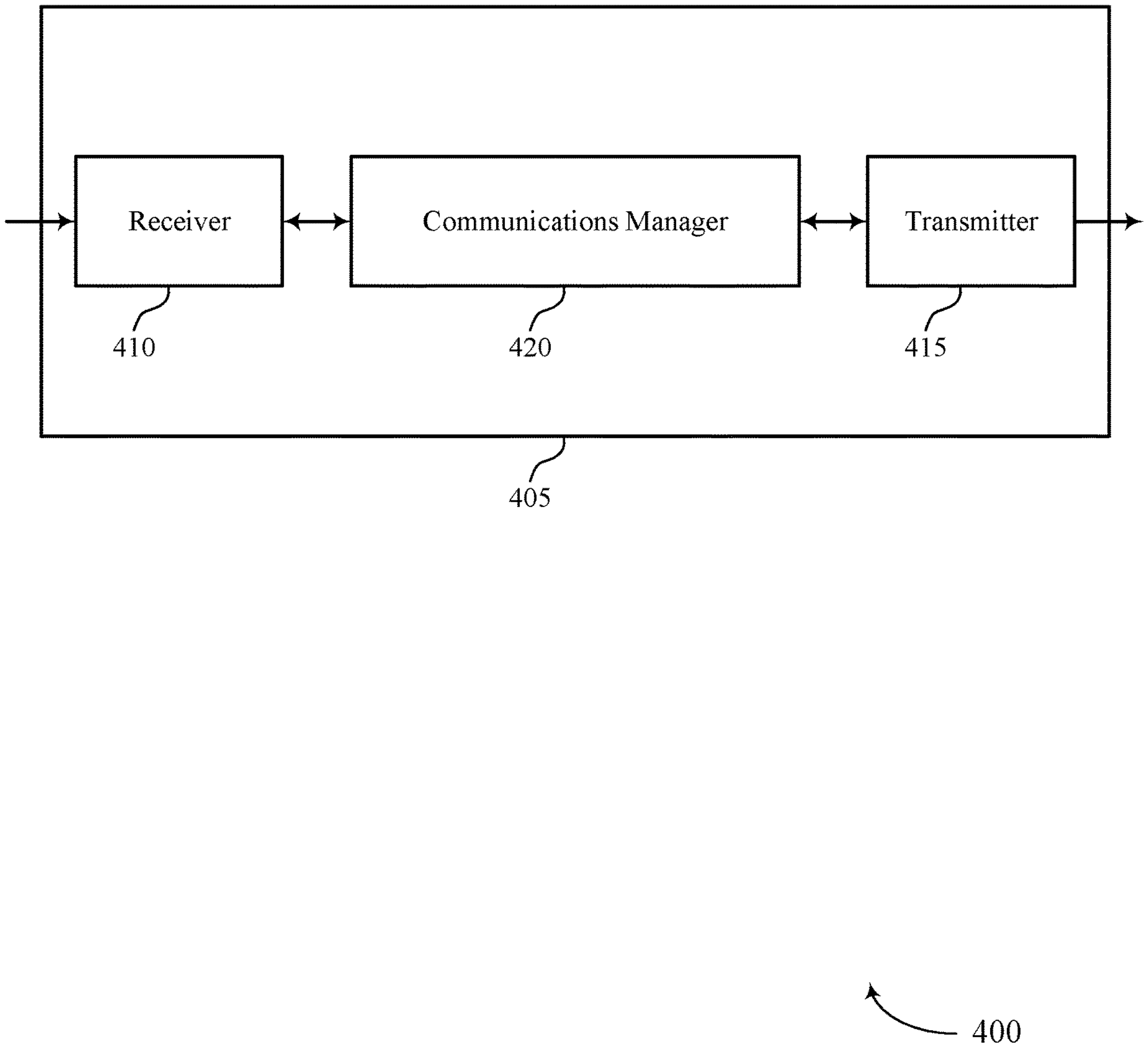
FIGS. 4 and 5 show block diagrams of devices that support sidelink channel coexistence of multiple radio access technologies in accordance with aspects of the present disclosure.

FIG. 4 shows a block diagram 400 of a device 405 that supports sidelink channel coexistence of multiple radio access technologies in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to sidelink channel coexistence of multiple radio access technologies). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to sidelink channel coexistence of multiple radio access technologies). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of sidelink channel coexistence of multiple radio access technologies as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for monitoring a resource group of a sidelink channel for an indication of sidelink messaging traffic. The communications manager 420 may be configured as or otherwise support a means for determining a ratio of sidelink messaging traffic by a first radio access technology relative to sidelink messaging traffic by a second radio access technology based on the monitoring. The communications manager 420 may be configured as or otherwise support a means for selecting, based on the ratio, a first resource pattern of a set of multiple different resource patterns. The communications manager 420 may be configured as or otherwise support a means for communicating, via the sidelink channel, a first sidelink message within a first resource of the resource group in accordance with the first resource pattern.

Additionally or alternatively, the communications manager 420 may support wireless communication by a second UE in accordance with examples as disclosed herein. For example, the communications manager 420 may be configured as or otherwise support a means for determining a ratio of sidelink messaging traffic by a first radio access technology relative to sidelink messaging traffic by a second radio access technology. The communications manager 420 may be configured as or otherwise support a means for receiving, from a first UE operating in accordance with the first radio access technology, control signaling indicating a first resource pattern of a set of multiple different resource patterns associated with a resource group of a sidelink channel, the second UE operating in accordance with the first radio access technology. The communications manager 420 may be configured as or otherwise support a means for transmitting, based on the ratio, second control signaling indicating approval of the first resource pattern or indicating a second resource pattern that differs from the first resource pattern.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for selecting a resource pattern in accordance with an estimated ratio of sidelink messaging traffic associated with the first radio access technology relative to sidelink messaging traffic associated with the second radio access technology resulting in reduced processing, reduced power consumption, and more efficient utilization of communication resources.

Figure 5:
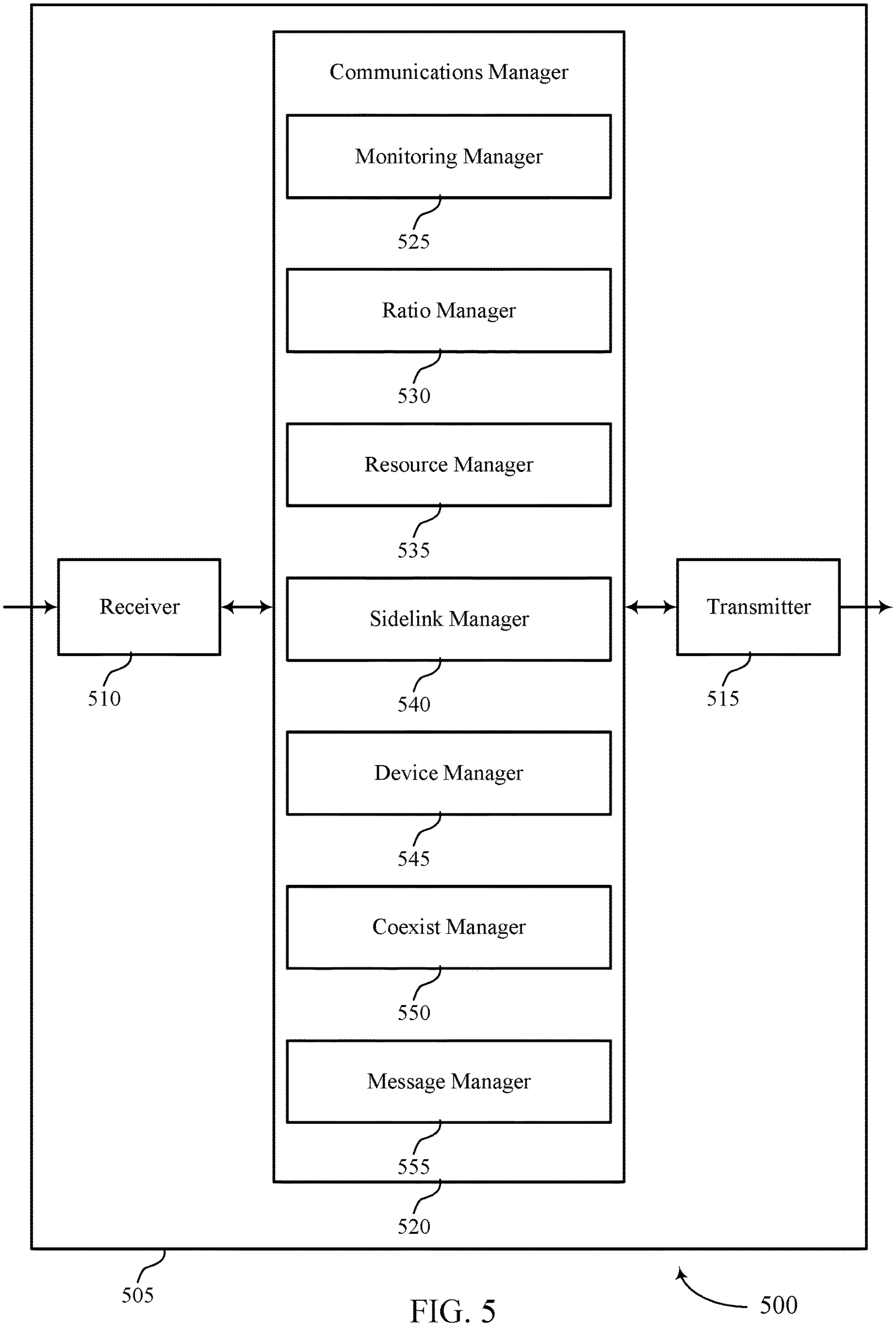

FIG. 5 shows a block diagram 500 of a device 505 that supports sidelink channel coexistence of multiple radio access technologies in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink channel coexistence of multiple radio access technologies). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink channel coexistence of multiple radio access technologies). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of sidelink channel coexistence of multiple radio access technologies as described herein. For example, the communications manager 520 may include a monitoring manager 525, a ratio manager 530, a resource manager 535, a sidelink manager 540, a device manager 545, a coexist manager 550, a message manager 555, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The monitoring manager 525 may be configured as or otherwise support a means for monitoring a resource group of a sidelink channel for an indication of sidelink messaging traffic. The ratio manager 530 may be configured as or otherwise support a means for determining a ratio of sidelink messaging traffic by a first radio access technology relative to sidelink messaging traffic by a second radio access technology based on the monitoring. The resource manager 535 may be configured as or otherwise support a means for selecting, based on the ratio, a first resource pattern of a set of multiple different resource patterns. The sidelink manager 540 may be configured as or otherwise support a means for communicating, via the sidelink channel, a first sidelink message within a first resource of the resource group in accordance with the first resource pattern.

Additionally or alternatively, the communications manager 520 may support wireless communication by a second UE in accordance with examples as disclosed herein. The device manager 545 may be configured as or otherwise support a means for determining a ratio of sidelink messaging traffic by a first radio access technology relative to sidelink messaging traffic by a second radio access technology. The coexist manager 550 may be configured as or otherwise support a means for receiving, from a first UE operating in accordance with the first radio access technology, control signaling indicating a first resource pattern of a set of multiple different resource patterns associated with a resource group of a sidelink channel, the second UE operating in accordance with the first radio access technology. The message manager 555 may be configured as or otherwise support a means for transmitting, based on the ratio, second control signaling indicating approval of the first resource pattern or indicating a second resource pattern that differs from the first resource pattern.

Figure 6:
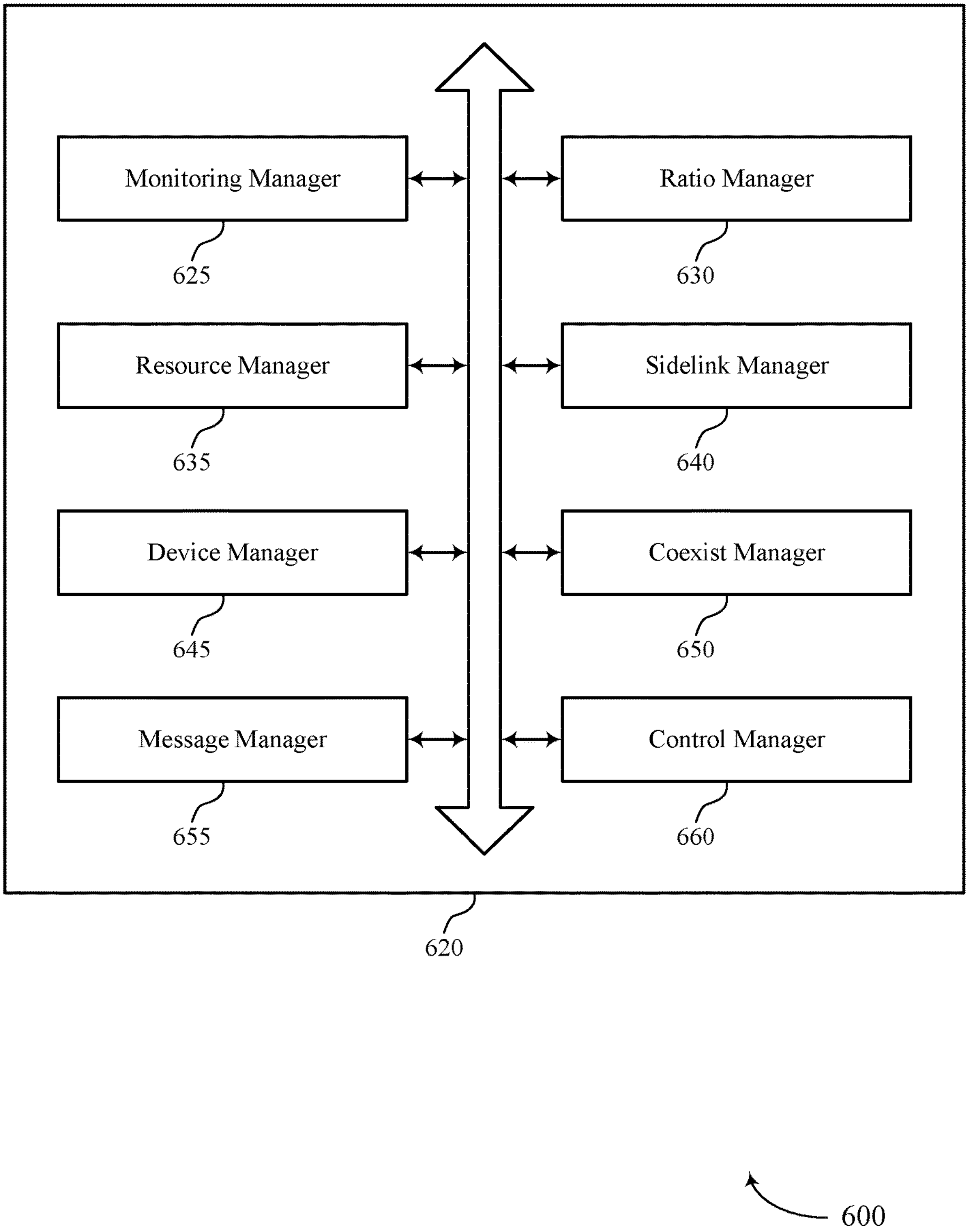
FIG. 6 shows a block diagram of a communications manager that supports sidelink channel coexistence of multiple radio access technologies in accordance with aspects of the present disclosure.

FIG. 6 shows a block diagram 600 of a communications manager 620 that supports sidelink channel coexistence of multiple radio access technologies in accordance with aspects of the present disclosure. The communications manager 620 may be an example of aspects of a communications manager 420, a communications manager 520, or both, as described herein. The communications manager 620, or various components thereof, may be an example of means for performing various aspects of sidelink channel coexistence of multiple radio access technologies as described herein. For example, the communications manager 620 may include a monitoring manager 625, a ratio manager 630, a resource manager 635, a sidelink manager 640, a device manager 645, a coexist manager 650, a message manager 655, a control manager 660, or any combination thereof. Each of these components may communicate, directly or indirectly, with one another (e.g., via one or more buses).

The communications manager 620 may support wireless communication at a first UE in accordance with examples as disclosed herein. The monitoring manager 625 may be configured as or otherwise support a means for monitoring a resource group of a sidelink channel for an indication of sidelink messaging traffic. The ratio manager 630 may be configured as or otherwise support a means for determining a ratio of sidelink messaging traffic by a first radio access technology relative to sidelink messaging traffic by a second radio access technology based on the monitoring.

In some examples, to support monitoring the resource group, the monitoring manager 625 may be configured as or otherwise support a means for determining a first number of decoded control messages that are of the first radio access technology, and a second number of decoded control messages that are of the second radio access technology, where the ratio is determined based on the first number of decoded control messages and the second number of decoded control messages.

In some examples, to support monitoring the resource group, the monitoring manager 625 may be configured as or otherwise support a means for monitoring the resource group to determine a first channel busy ratio for the first radio access technology, and a second channel busy ratio for the second radio access technology, where the ratio is determined based on the first channel busy ratio and the second channel busy ratio.

In some examples, to support monitoring the resource group, the monitoring manager 625 may be configured as or otherwise support a means for receiving, from a second UE, sidelink control information indicating that the second UE operates in accordance with the first radio access technology. In some examples, to support monitoring the resource group, the monitoring manager 625 may be configured as or otherwise support a means for receiving, from a second UE, a control message indicating that the second UE operates in accordance with the first radio access technology.

In some examples, to support communicating the first sidelink message, the monitoring manager 625 may be configured as or otherwise support a means for determining a first number of devices, including the second UE, that operate in accordance with the first radio access technology, and a second number of devices that operate in accordance with the second radio access technology, where the ratio is determined based on the first number of devices and the second number of devices.

The resource manager 635 may be configured as or otherwise support a means for selecting, based on the ratio, a first resource pattern of a set of multiple different resource patterns. The sidelink manager 640 may be configured as or otherwise support a means for communicating, via the sidelink channel, a first sidelink message within a first resource of the resource group in accordance with the first resource pattern.

In some examples, to support selecting the first resource pattern, the resource manager 635 may be configured as or otherwise support a means for selecting the first resource pattern to allocate some or all resources of the resource group to the first radio access technology based on the ratio, where remaining resources are allocated to the second radio access technology based on the ratio.

In some examples, the resource manager 635 may be configured as or otherwise support a means for determining an updated ratio based on the monitoring. In some examples, the resource manager 635 may be configured as or otherwise support a means for selecting a second resource pattern of the set of multiple different resource patterns based on the updated ratio.

In some examples, to support communicating the first sidelink message, the sidelink manager 640 may be configured as or otherwise support a means for communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

In some examples, the sidelink manager 640 may be configured as or otherwise support a means for transmitting, via the first radio access technology, a second sidelink message in a second resource of the resource group indicated by the first resource pattern to be allocated to the second radio access technology based on a priority of the second sidelink message.

Additionally or alternatively, the communications manager 620 may support wireless communication by a second UE in accordance with examples as disclosed herein. The device manager 645 may be configured as or otherwise support a means for determining a ratio of sidelink messaging traffic by a first radio access technology relative to sidelink messaging traffic by a second radio access technology. The coexist manager 650 may be configured as or otherwise support a means for receiving, from a first UE operating in accordance with the first radio access technology, control signaling indicating a first resource pattern of a set of multiple different resource patterns associated with a resource group of a sidelink channel, the second UE operating in accordance with the first radio access technology. The message manager 655 may be configured as or otherwise support a means for transmitting, based on the ratio, second control signaling indicating approval of the first resource pattern or indicating a second resource pattern that differs from the first resource pattern.

In some examples, the message manager 655 may be configured as or otherwise support a means for communicating, via the sidelink channel, a first sidelink message within a first resource of the resource group in accordance with the first resource pattern. In some examples, the communicating is based on the second control signaling.

In some examples, the coexist manager 650 may be configured as or otherwise support a means for selecting the first resource pattern to allocate some or all resources of the resource group to the first radio access technology based on the ratio.

In some examples, the message manager 655 may be configured as or otherwise support a means for communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

In some examples, the coexist manager 650 may be configured as or otherwise support a means for receiving, via the first radio access technology, a second sidelink message in a second resource of the resource group indicated by the first resource pattern to be allocated to the second radio access technology based on a priority of the second sidelink message.

In some examples, the message manager 655 may be configured as or otherwise support a means for transmitting, to the first UE, sidelink control information indicating that the second UE operates in accordance with the first radio access technology. In some examples, the message manager 655 may be configured as or otherwise support a means for transmitting, to the first UE, a control message indicating that the second UE operates in accordance with the first radio access technology.

In some examples, the message manager 655 may be configured as or otherwise support a means for transmitting or receiving a sidelink control channel signal of the second radio access technology in one or more transmission time intervals. In some examples, the message manager 655 may be configured as or otherwise support a means for transmitting or receiving control signaling indicating the set of multiple different resource patterns.

In some examples, the control manager 660 may be configured as or otherwise support a means for transmitting or receiving, by the first UE operating in accordance with the first radio access technology, first control signaling indicating the first resource pattern to a second UE operating in accordance with the first radio access technology.

In some examples, the control manager 660 may be configured as or otherwise support a means for receiving second control signaling indicating approval of the first resource pattern or indicating a second resource pattern that differs from the first resource pattern, where the selecting is based on the second control signaling.

In some examples, the control manager 660 may be configured as or otherwise support a means for transmitting or receiving a sidelink control channel signal of the second radio access technology in one or more transmission time intervals. In some examples, the control manager 660 may be configured as or otherwise support a means for transmitting or receiving control signaling indicating the set of multiple different resource patterns.

In some examples, the set of multiple different resource patterns includes a set of multiple different time division multiplexing resource patterns. In some examples, the first resource pattern includes a sidelink feedback channel that occurs periodically or semi-persistently. In some examples, the first radio access technology includes a new radio (NR) radio access technology and the second radio access technology includes a long term evolution (LTE) radio access technology.

Figure 7:
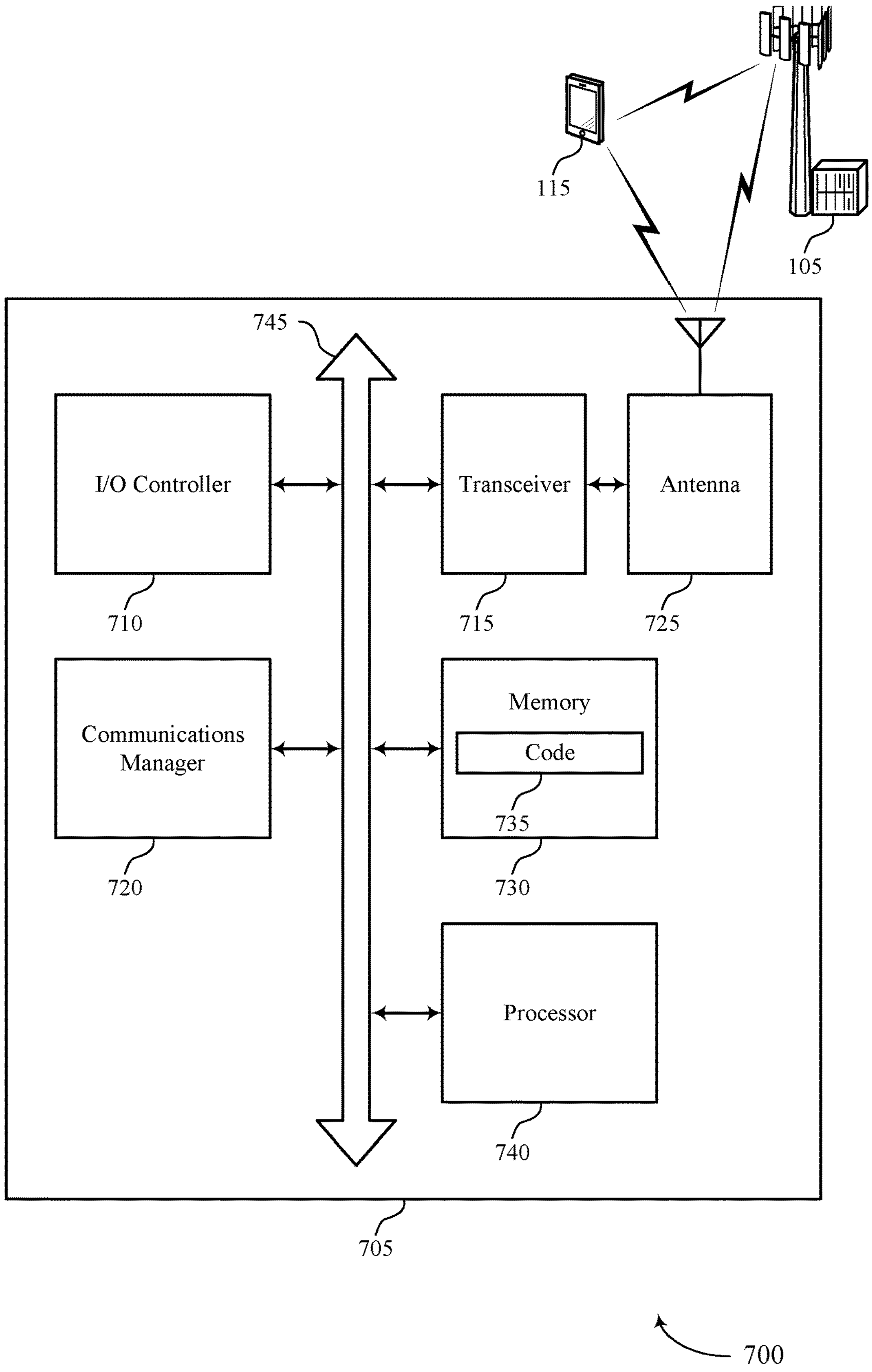
FIG. 7 shows a diagram of a system including a device that supports sidelink channel coexistence of multiple radio access technologies in accordance with aspects of the present disclosure.

FIG. 7 shows a diagram of a system 700 including a device 705 that supports sidelink channel coexistence of multiple radio access technologies in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink channel coexistence of multiple radio access technologies). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for monitoring a resource group of a sidelink channel for an indication of sidelink messaging traffic. The communications manager 720 may be configured as or otherwise support a means for determining a ratio of sidelink messaging traffic by a first radio access technology relative to sidelink messaging traffic by a second radio access technology based on the monitoring. The communications manager 720 may be configured as or otherwise support a means for selecting, based on the ratio, a first resource pattern of a set of multiple different resource patterns. The communications manager 720 may be configured as or otherwise support a means for communicating, via the sidelink channel, a first sidelink message within a first resource of the resource group in accordance with the first resource pattern.

Additionally or alternatively, the communications manager 720 may support wireless communication by a second UE in accordance with examples as disclosed herein. For example, the communications manager 720 may be configured as or otherwise support a means for determining a ratio of sidelink messaging traffic by a first radio access technology relative to sidelink messaging traffic by a second radio access technology. The communications manager 720 may be configured as or otherwise support a means for receiving, from a first UE operating in accordance with the first radio access technology, control signaling indicating a first resource pattern of a set of multiple different resource patterns associated with a resource group of a sidelink channel, the second UE operating in accordance with the first radio access technology. The communications manager 720 may be configured as or otherwise support a means for transmitting, based on the ratio, second control signaling indicating approval of the first resource pattern or indicating a second resource pattern that differs from the first resource pattern.

By including or configuring the communications manager 720 in accordance with examples as described herein, the device 705 may support techniques for selecting a resource pattern in accordance with an estimated ratio of sidelink messaging traffic associated with the first radio access technology relative to sidelink messaging traffic associated with the second radio access technology, resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of sidelink channel coexistence of multiple radio access technologies as described herein, or the processor 740 and the memory 730 may be otherwise configured to perform or support such operations.

Figure 8:
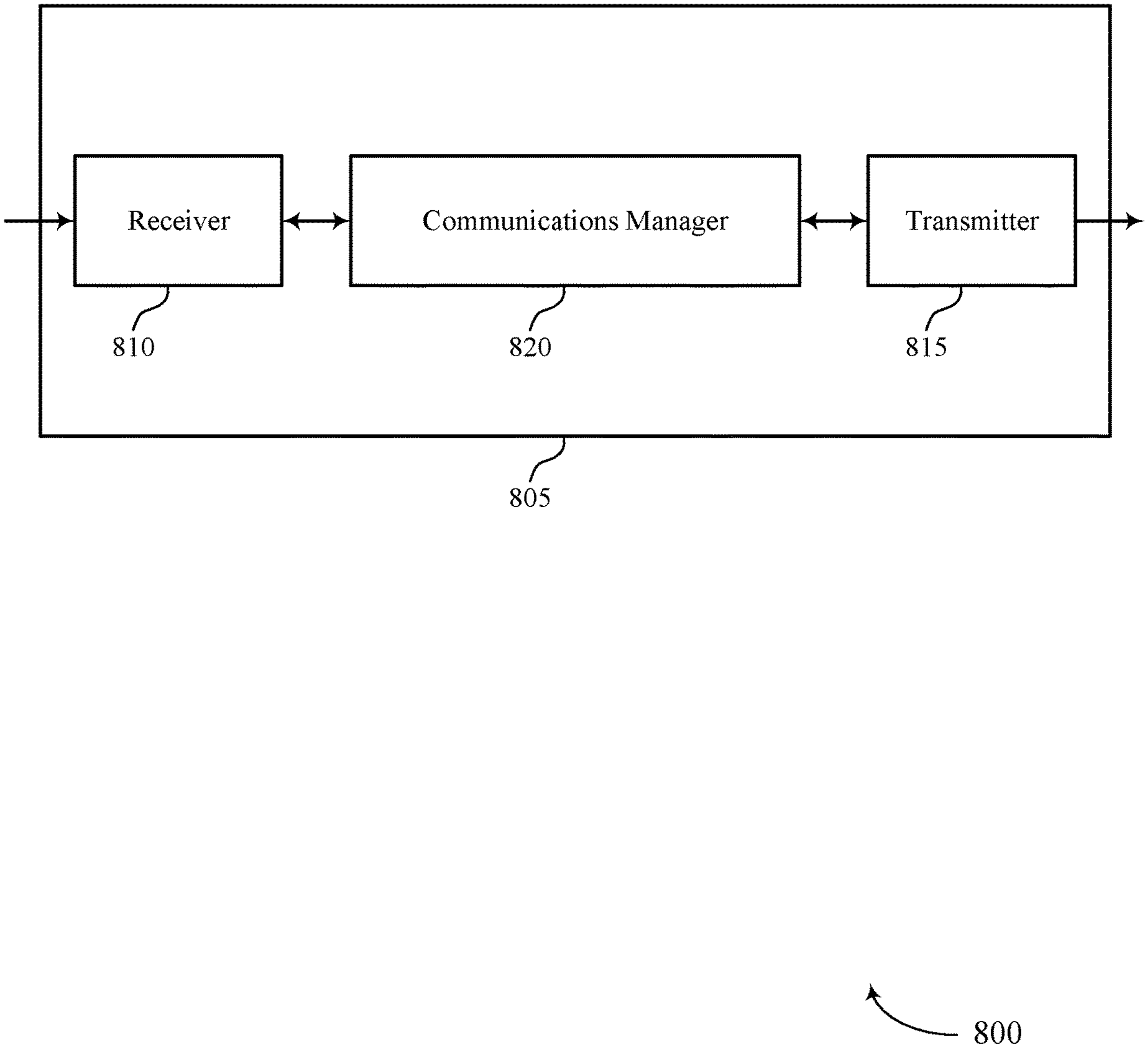
FIGS. 8 and 9 show block diagrams of devices that support sidelink channel coexistence of multiple radio access technologies in accordance with aspects of the present disclosure.

FIG. 8 shows a block diagram 800 of a device 805 that supports sidelink channel coexistence of multiple radio access technologies in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink channel coexistence of multiple radio access technologies). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink channel coexistence of multiple radio access technologies). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of sidelink channel coexistence of multiple radio access technologies as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel. The communications manager 820 may be configured as or otherwise support a means for transmitting, to one or more UEs operating in accordance with the first radio access technology, control signaling indicating the first resource pattern.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for selecting a resource pattern in accordance with an estimated ratio of sidelink messaging traffic associated with the first radio access technology relative to sidelink messaging traffic associated with the second radio access technology, resulting in reduced processing, reduced power consumption, and more efficient utilization of communication resources.

Figure 9:
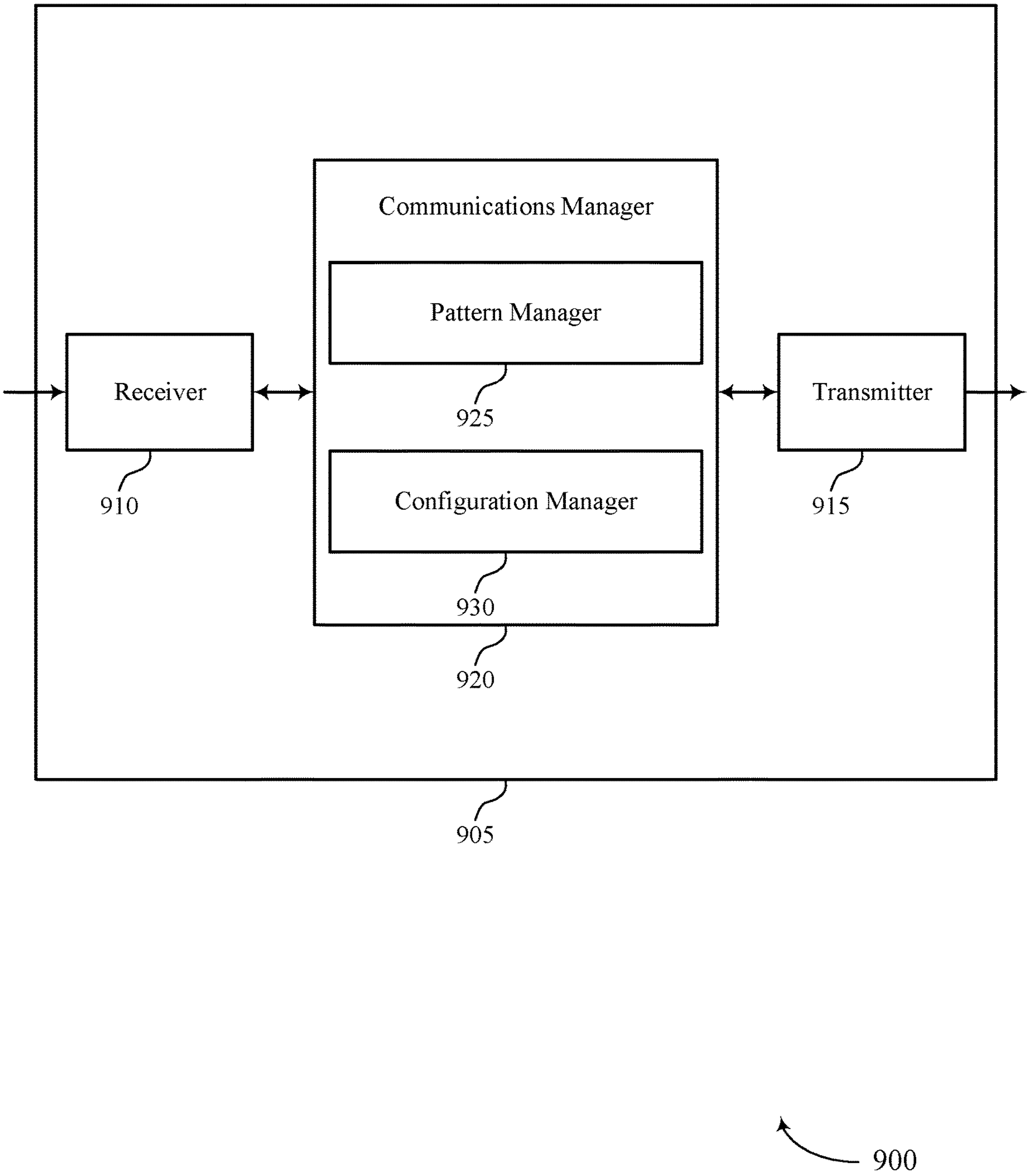

FIG. 9 shows a block diagram 900 of a device 905 that supports sidelink channel coexistence of multiple radio access technologies in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink channel coexistence of multiple radio access technologies). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink channel coexistence of multiple radio access technologies). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of sidelink channel coexistence of multiple radio access technologies as described herein. For example, the communications manager 920 may include a pattern manager 925 a configuration manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The pattern manager 925 may be configured as or otherwise support a means for selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel. The configuration manager 930 may be configured as or otherwise support a means for transmitting, to one or more UEs operating in accordance with the first radio access technology, control signaling indicating the first resource pattern.

Figure 10:
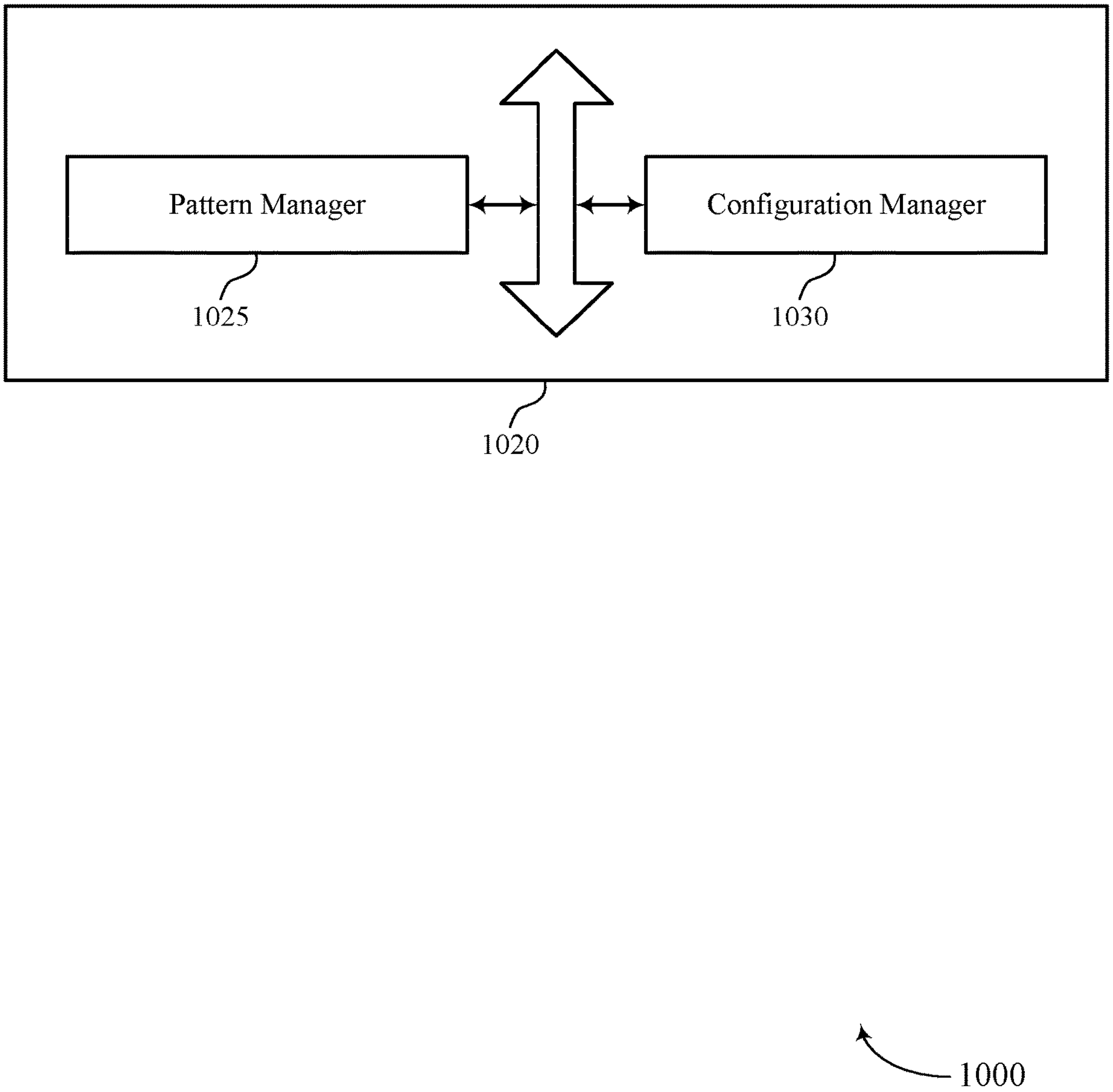
FIG. 10 shows a block diagram of a communications manager that supports sidelink channel coexistence of multiple radio access technologies in accordance with aspects of the present disclosure.

FIG. 10 shows a block diagram 1000 of a communications manager 1020 that supports sidelink channel coexistence of multiple radio access technologies in accordance with aspects of the present disclosure. The communications manager 1020 may be an example of aspects of a communications manager 820, a communications manager 920, or both, as described herein. The communications manager 1020, or various components thereof, may be an example of means for performing various aspects of sidelink channel coexistence of multiple radio access technologies as described herein. For example, the communications manager 1020 may include a pattern manager 1025 a configuration manager 1030, or any combination thereof. Each of these components may communicate, directly or indirectly, with one another (e.g., via one or more buses).

The communications manager 1020 may support wireless communication at a base station in accordance with examples as disclosed herein. The pattern manager 1025 may be configured as or otherwise support a means for selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel. The configuration manager 1030 may be configured as or otherwise support a means for transmitting, to one or more UEs operating in accordance with the first radio access technology, control signaling indicating the first resource pattern.

In some examples, the pattern manager 1025 may be configured as or otherwise support a means for receiving an indication of the first resource pattern from a first UE operating in accordance with the first radio access technology.

In some examples, the configuration manager 1030 may be configured as or otherwise support a means for transmitting second control signaling to the one or more UEs operating in accordance with the first radio access technology indicating that a sidelink feedback channel associated with the resource group to occur periodically or semi-persistently.

Figure 11:
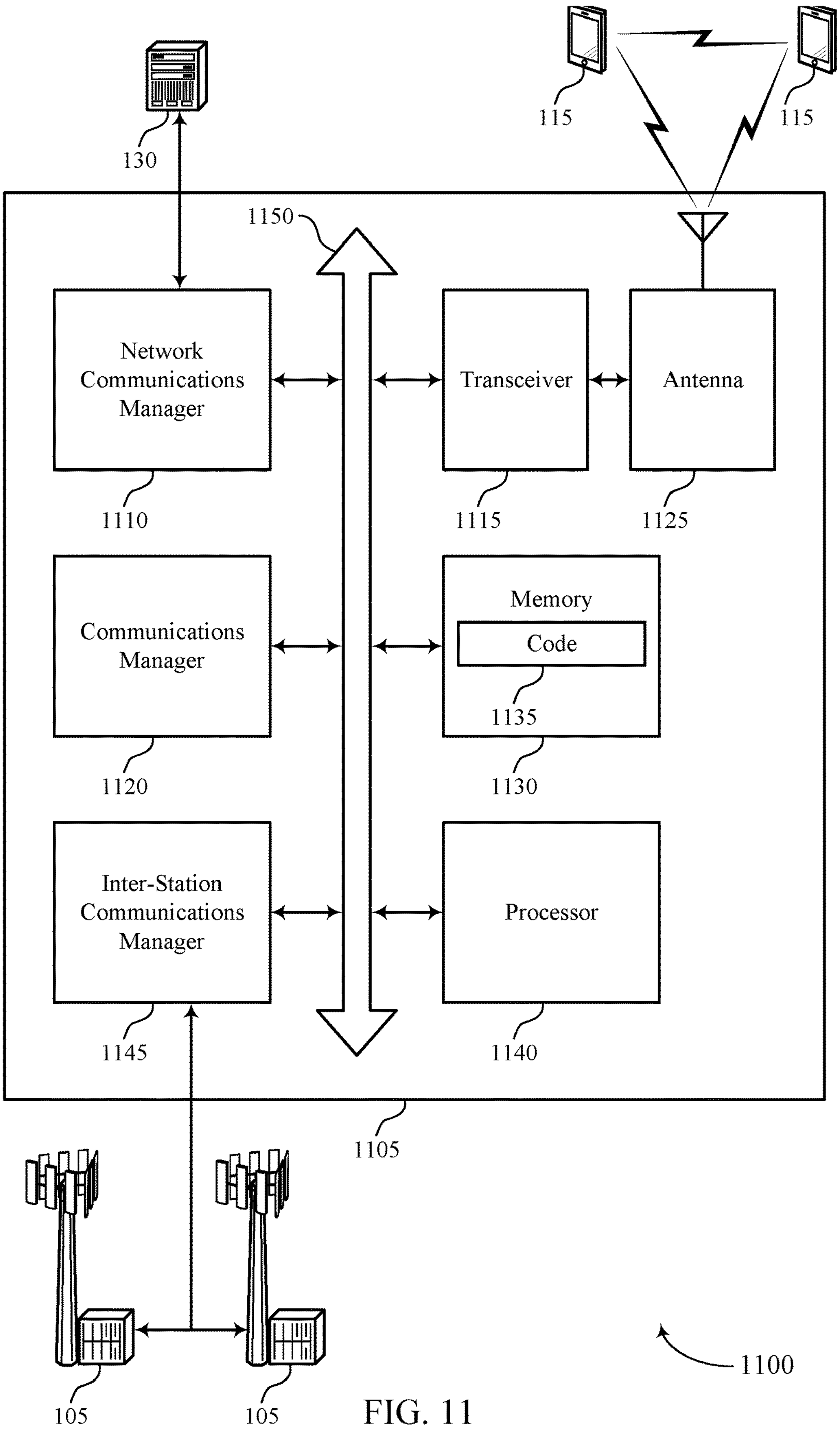
FIG. 11 shows a diagram of a system including a device that supports sidelink channel coexistence of multiple radio access technologies in accordance with aspects of the present disclosure.

FIG. 11 shows a diagram of a system 1100 including a device 1105 that supports sidelink channel coexistence of multiple radio access technologies in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink channel coexistence of multiple radio access technologies). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel. The communications manager 1120 may be configured as or otherwise support a means for transmitting, to one or more UEs operating in accordance with the first radio access technology, control signaling indicating the first resource pattern.

By including or configuring the communications manager 1120 in accordance with examples as described herein, the device 1105 may support techniques for selecting a resource pattern in accordance with an estimated ratio of sidelink messaging traffic associated with the first radio access technology relative to sidelink messaging traffic associated with the second radio access technology, resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of sidelink channel coexistence of multiple radio access technologies as described herein, or the processor 1140 and the memory 1130 may be otherwise configured to perform or support such operations.

Figure 12:
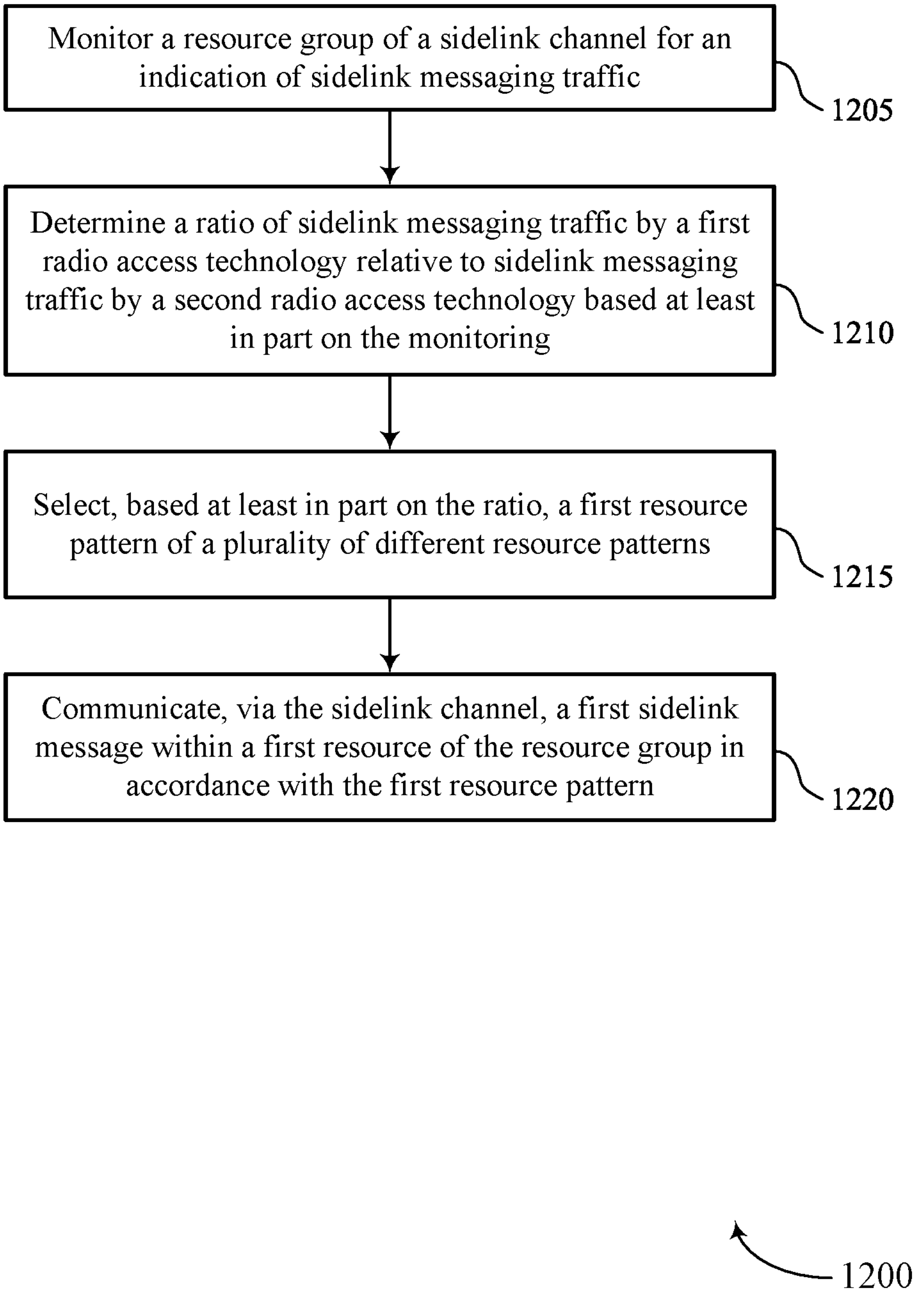
FIGS. 12 through 15 show flowcharts illustrating methods that support sidelink channel coexistence of multiple radio access technologies in accordance with aspects of the present disclosure.

FIG. 12 shows a flowchart illustrating a method 1200 that supports sidelink channel coexistence of multiple radio access technologies in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include monitoring a resource group of a sidelink channel for an indication of sidelink messaging traffic. The operations of 1205 may be performed in accordance with examples as disclosed herein. In some examples, aspects of the operations of 1205 may be performed by a monitoring manager 625 as described with reference to FIG. 6.

At 1210, the method may include determining a ratio of sidelink messaging traffic by a first radio access technology relative to sidelink messaging traffic by a second radio access technology based on the monitoring. The operations of 1210 may be performed in accordance with examples as disclosed herein. In some examples, aspects of the operations of 1210 may be performed by a ratio manager 630 as described with reference to FIG. 6.

At 1215, the method may include selecting, based on the ratio, a first resource pattern of a set of multiple different resource patterns. The operations of 1215 may be performed in accordance with examples as disclosed herein. In some examples, aspects of the operations of 1215 may be performed by a resource manager 635 as described with reference to FIG. 6.

At 1220, the method may include communicating, via the sidelink channel, a first sidelink message within a first resource of the resource group in accordance with the first resource pattern. The operations of 1220 may be performed in accordance with examples as disclosed herein. In some examples, aspects of the operations of 1220 may be performed by a sidelink manager 640 as described with reference to FIG. 6.

Figure 13:
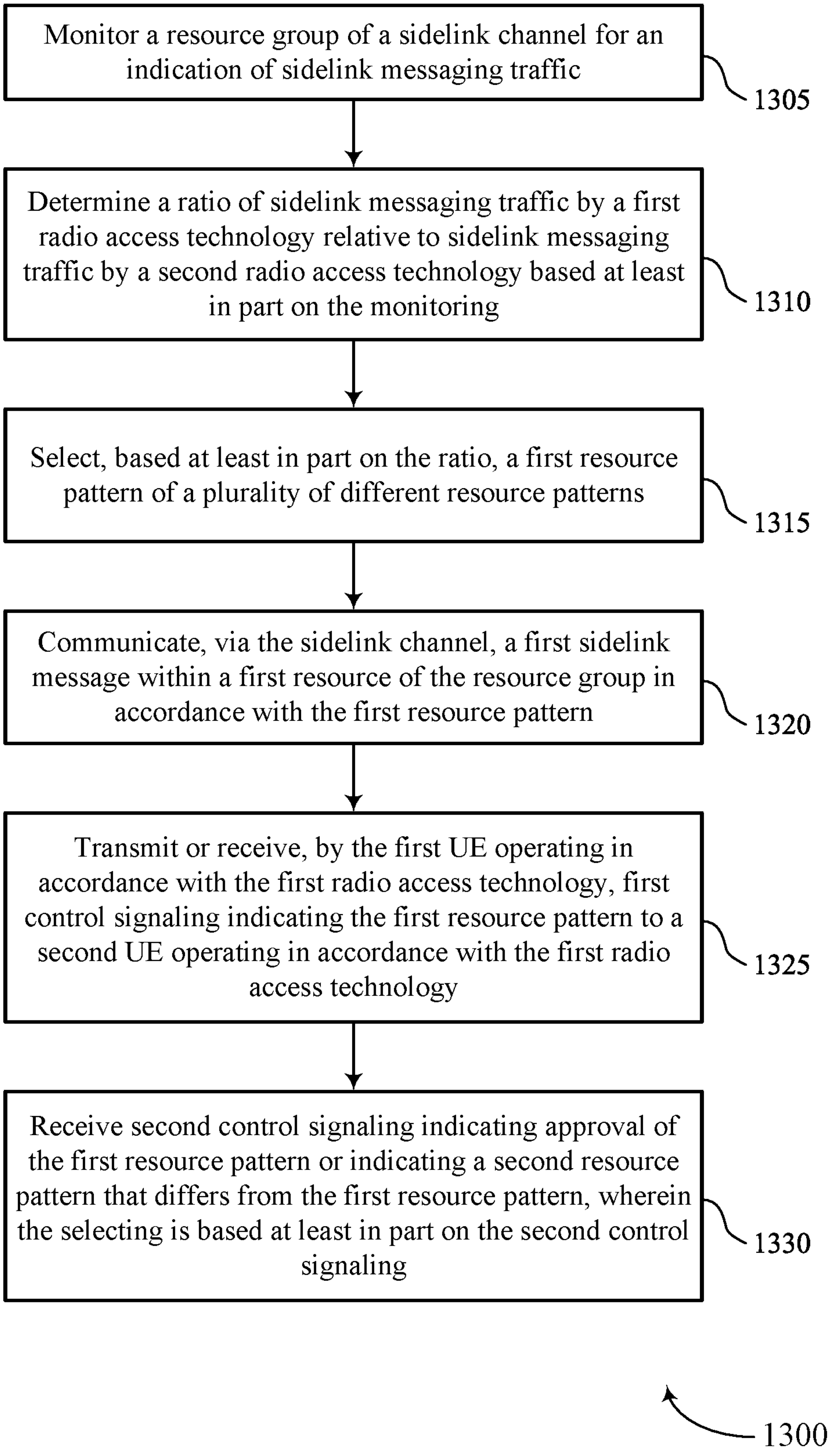

FIG. 13 shows a flowchart illustrating a method 1300 that supports sidelink channel coexistence of multiple radio access technologies in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include monitoring a resource group of a sidelink channel for an indication of sidelink messaging traffic. The operations of 1305 may be performed in accordance with examples as disclosed herein. In some examples, aspects of the operations of 1305 may be performed by a monitoring manager 625 as described with reference to FIG. 6.

At 1310, the method may include determining a ratio of sidelink messaging traffic by a first radio access technology relative to sidelink messaging traffic by a second radio access technology based on the monitoring. The operations of 1310 may be performed in accordance with examples as disclosed herein. In some examples, aspects of the operations of 1310 may be performed by a ratio manager 630 as described with reference to FIG. 6.

At 1315, the method may include selecting, based on the ratio, a first resource pattern of a set of multiple different resource patterns. The operations of 1315 may be performed in accordance with examples as disclosed herein. In some examples, aspects of the operations of 1315 may be performed by a resource manager 635 as described with reference to FIG. 6.

At 1320, the method may include communicating, via the sidelink channel, a first sidelink message within a first resource of the resource group in accordance with the first resource pattern. The operations of 1320 may be performed in accordance with examples as disclosed herein. In some examples, aspects of the operations of 1320 may be performed by a sidelink manager 640 as described with reference to FIG. 6.

At 1325, the method may include transmitting or receiving, by the first UE operating in accordance with the first radio access technology, first control signaling indicating the first resource pattern to a second UE operating in accordance with the first radio access technology. The operations of 1325 may be performed in accordance with examples as disclosed herein. In some examples, aspects of the operations of 1325 may be performed by a control manager 660 as described with reference to FIG. 6.

At 1330, the method may include receiving second control signaling indicating approval of the first resource pattern or indicating a second resource pattern that differs from the first resource pattern, where the selecting is based on the second control signaling. The operations of 1330 may be performed in accordance with examples as disclosed herein. In some examples, aspects of the operations of 1330 may be performed by a control manager 660 as described with reference to FIG. 6.

Figure 14:
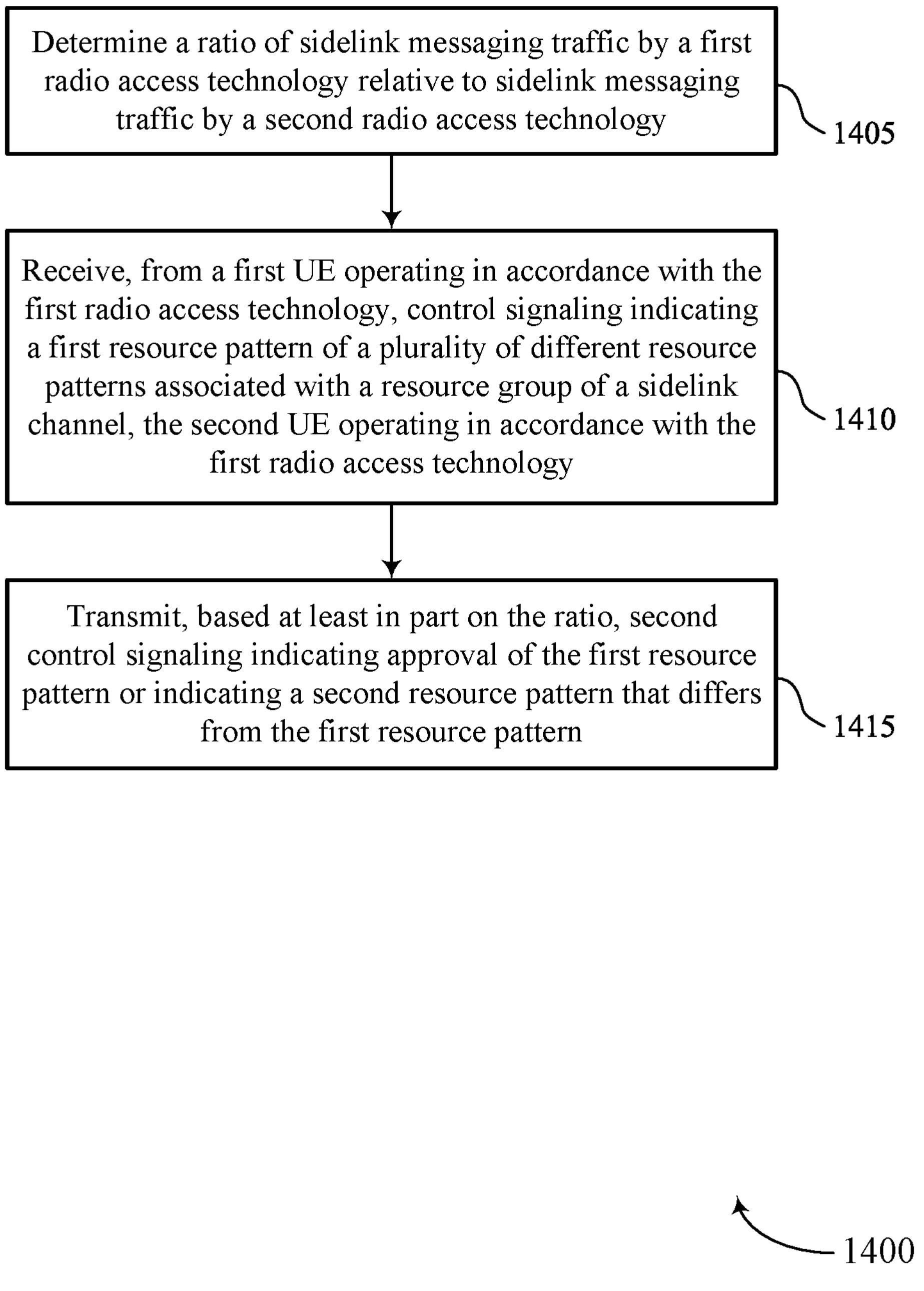

FIG. 14 shows a flowchart illustrating a method 1400 that supports sidelink channel coexistence of multiple radio access technologies in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include determining a ratio of sidelink messaging traffic by a first radio access technology relative to sidelink messaging traffic by a second radio access technology. The operations of 1405 may be performed in accordance with examples as disclosed herein. In some examples, aspects of the operations of 1405 may be performed by a device manager 645 as described with reference to FIG. 6.

At 1410, the method may include receiving, from a first UE operating in accordance with the first radio access technology, control signaling indicating a first resource pattern of a set of multiple different resource patterns associated with a resource group of a sidelink channel, the second UE operating in accordance with the first radio access technology. The operations of 1410 may be performed in accordance with examples as disclosed herein. In some examples, aspects of the operations of 1410 may be performed by a coexist manager 650 as described with reference to FIG. 6.

At 1415, the method may include transmitting, based on the ratio, second control signaling indicating approval of the first resource pattern or indicating a second resource pattern that differs from the first resource pattern. The operations of 1415 may be performed in accordance with examples as disclosed herein. In some examples, aspects of the operations of 1415 may be performed by a message manager 655 as described with reference to FIG. 6.

Figure 15:
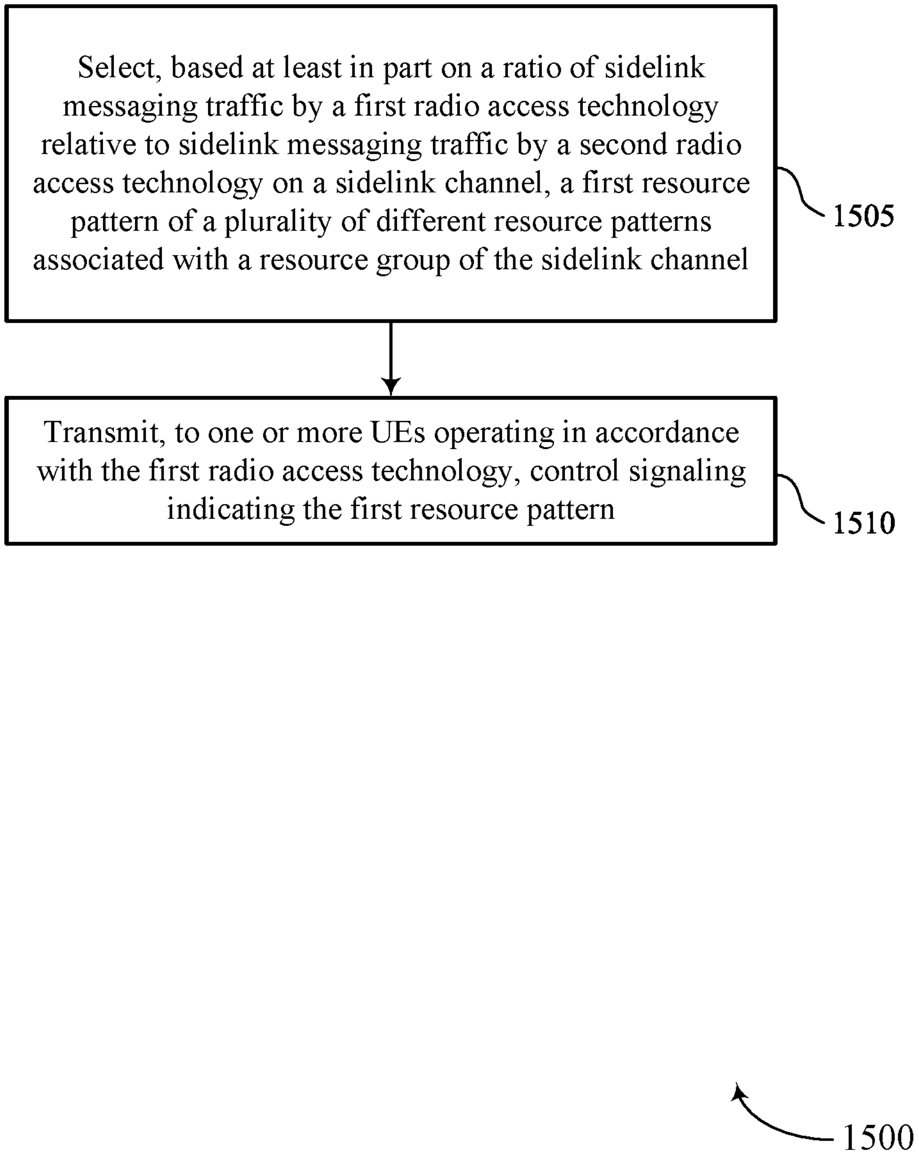

FIG. 15 shows a flowchart illustrating a method 1500 that supports sidelink channel coexistence of multiple radio access technologies in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include selecting, based on a ratio of sidelink messaging traffic by a first radio access technology relative to sidelink messaging traffic by a second radio access technology on a sidelink channel, a first resource pattern of a set of multiple different resource patterns associated with a resource group of the sidelink channel. The operations of 1505 may be performed in accordance with examples as disclosed herein. In some examples, aspects of the operations of 1505 may be performed by a pattern manager 1025 as described with reference to FIG. 10.

At 1510, the method may include transmitting, to one or more UEs operating in accordance with the first radio access technology, control signaling indicating the first resource pattern. The operations of 1510 may be performed in accordance with examples as disclosed herein. In some examples, aspects of the operations of 1510 may be performed by a configuration manager 1030 as described with reference to FIG. 10.

The following provides an overview of aspects of the present disclosure:

Aspect 1: A method for wireless communication at a first UE, comprising: monitoring a resource group of a sidelink channel for an indication of sidelink messaging traffic; determining a ratio of sidelink messaging traffic by a first radio access technology relative to sidelink messaging traffic by a second radio access technology based at least in part on the monitoring; selecting, based at least in part on the ratio, a first resource pattern of a plurality of different resource patterns; and communicating, via the sidelink channel, a first sidelink message within a first resource of the resource group in accordance with the first resource pattern.

Aspect 2: The method of aspect 1, comprising: transmitting or receiving, by the first UE operating in accordance with the first radio access technology, first control signaling indicating the first resource pattern to a second UE operating in accordance with the first radio access technology.

Aspect 3: The method of aspect 2, comprising: receiving second control signaling indicating approval of the first resource pattern or indicating a second resource pattern that differs from the first resource pattern, wherein the selecting is based at least in part on the second control signaling.

Aspect 4: The method of any of aspects 1 through 3, wherein monitoring the resource group comprises: receiving, from a second UE, sidelink control information indicating that the second UE operates in accordance with the first radio access technology.

Aspect 5: The method of any of aspects 1 through 4, wherein monitoring the resource group comprises: receiving, from a second UE, a control message indicating that the second UE operates in accordance with the first radio access technology.

Aspect 6: The method of aspect 5, wherein communicating the first sidelink message comprises: determining a first number of devices, including the second UE, that operate in accordance with the first radio access technology, and a second number of devices that operate in accordance with the second radio access technology, wherein the ratio is determined based at least in part on the first number of devices and the second number of devices.

Aspect 7: The method of any of aspects 1 through 6, wherein communicating the first sidelink message comprises: communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

Aspect 8: The method of any of aspects 1 through 7, comprising: transmitting, via the first radio access technology, a second sidelink message in a second resource of the resource group indicated by the first resource pattern to be allocated to the second radio access technology based at least in part on a priority of the second sidelink message.

Aspect 9: The method of any of aspects 1 through 8, wherein selecting the first resource pattern comprises: selecting the first resource pattern to allocate some or all resources of the resource group to the first radio access technology based at least in part on the ratio, wherein remaining resources are allocated to the second radio access technology based at least in part on the ratio.

Aspect 10: The method of any of aspects 1 through 9, comprising: transmitting or receiving a sidelink control channel signal of the second radio access technology in one or more transmission time intervals.

Aspect 11: The method of any of aspects 1 through 10, comprising: transmitting or receiving control signaling indicating the plurality of different resource patterns.

Aspect 12: The method of any of aspects 1 through 11, wherein monitoring the resource group comprises: determining a first number of decoded messages that are of the first radio access technology, and a second number of decoded messages that are of the second radio access technology, wherein the ratio is determined based at least in part on the first number of decoded messages and the second number of decoded messages.

Aspect 13: The method of any of aspects 1 through 12, wherein monitoring the resource group comprises: monitoring the resource group to determine a first channel busy ratio for the first radio access technology, and a second channel busy ratio for the second radio access technology, wherein the ratio is determined based at least in part on the first channel busy ratio and the second channel busy ratio.

Aspect 14: The method of any of aspects 1 through 13, comprising: determining an updated ratio based at least in part on the monitoring selecting a second resource pattern of the plurality of different resource patterns based at least in part on the updated ratio.

Aspect 15: The method of any of aspects 1 through 14, wherein the plurality of different resource patterns comprises a plurality of different time division multiplexing resource patterns.

Aspect 16: The method of any of aspects 1 through 15, wherein the first resource pattern comprises a sidelink feedback channel that occurs periodically or semi-persistently.

Aspect 17: The method of any of aspects 1 through 16, wherein the first radio access technology comprises a new radio (NR) radio access technology and the second radio access technology comprises a long term evolution (LTE) radio access technology.

Aspect 18: A method for wireless communication by a second UE, comprising: determining a ratio of sidelink messaging traffic by a first radio access technology relative to sidelink messaging traffic by a second radio access technology; receiving, from a first UE operating in accordance with the first radio access technology, control signaling indicating a first resource pattern of a plurality of different resource patterns associated with a resource group of a sidelink channel, the second UE operating in accordance with the first radio access technology; and transmitting, based at least in part on the ratio, second control signaling indicating approval of the first resource pattern or indicating a second resource pattern that differs from the first resource pattern.

Aspect 19: The method of aspect 18, further comprising: communicating, via the sidelink channel, a first sidelink message within a first resource of the resource group in accordance with the first resource pattern.

Aspect 20: The method of aspect 19, wherein the communicating is based at least in part on the second control signaling.

Aspect 21: The method of any of aspects 19 through 20, further comprising: selecting the first resource pattern to allocate some or all resources of the resource group to the first radio access technology based at least in part on the ratio.

Aspect 22: The method of any of aspects 19 through 21, further comprising: communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

Aspect 23: The method of any of aspects 19 through 22, further comprising: receiving, via the first radio access technology, a second sidelink message in a second resource of the resource group indicated by the first resource pattern to be allocated to the second radio access technology based at least in part on a priority of the second sidelink message.

Aspect 24: The method of any of aspects 18 through 23, further comprising: transmitting, to the first UE, sidelink control information indicating that the second UE operates in accordance with the first radio access technology.

Aspect 25: The method of any of aspects 18 through 24, further comprising: transmitting, to the first UE, a control message indicating that the second UE operates in accordance with the first radio access technology.

Aspect 26: The method of any of aspects 18 through 25, comprising: transmitting or receiving a sidelink control channel signal of the second radio access technology in one or more transmission time intervals.

Aspect 27: The method of any of aspects 18 through 26, comprising: transmitting or receiving control signaling indicating the plurality of different resource patterns.

Aspect 28: A method for wireless communication at a base station, comprising: selecting, based at least in part on a ratio of sidelink messaging traffic by a first radio access technology relative to sidelink messaging traffic by a second radio access technology on a sidelink channel, a first resource pattern of a plurality of different resource patterns associated with a resource group of the sidelink channel; and transmitting, to one or more UEs operating in accordance with the first radio access technology, control signaling indicating the first resource pattern.

Aspect 29: The method of aspect 28, comprising: receiving an indication of the first resource pattern from a first UE operating in accordance with the first radio access technology.

Aspect 30: An apparatus for wireless communication at a first UE, comprising a processor; memory coupled with the processor; and instructions stored in the memory and executable by the processor to cause the apparatus to perform a method of any of aspects 1 through 17.

Aspect 31: An apparatus for wireless communication at a first UE, comprising at least one means for performing a method of any of aspects 1 through 17.

Aspect 32: A non-transitory computer-readable medium storing code for wireless communication at a first UE, the code comprising instructions executable by a processor to perform a method of any of aspects 1 through 17.

Aspect 33: An apparatus for wireless communication by a second UE, comprising a processor; memory coupled with the processor; and instructions stored in the memory and executable by the processor to cause the apparatus to perform a method of any of aspects 18 through 27.

Aspect 34: An apparatus for wireless communication by a second UE, comprising at least one means for performing a method of any of aspects 18 through 27.

Aspect 35: A non-transitory computer-readable medium storing code for wireless communication by a second UE, the code comprising instructions executable by a processor to perform a method of any of aspects 18 through 27.

Aspect 36: An apparatus for wireless communication at a base station, comprising a processor; memory coupled with the processor; and instructions stored in the memory and executable by the processor to cause the apparatus to perform a method of any of aspects 28 through 29.

Aspect 37: An apparatus for wireless communication at a base station, comprising at least one means for performing a method of any of aspects 28 through 29.

Aspect 38: A non-transitory computer-readable medium storing code for wireless communication at a base station, the code comprising instructions executable by a processor to perform a method of any of aspects 28 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

monitoring a resource group of a sidelink channel for an indication of sidelink messaging traffic;

determining a ratio of sidelink messaging traffic by a first radio access technology relative to sidelink messaging traffic by a second radio access technology based at least in part on the monitoring;

selecting, based at least in part on the ratio, a first resource pattern of a plurality of different resource patterns; and communicating, via the sidelink channel, a first sidelink message within a first resource of the resource group in accordance with the first resource pattern.

2. The method of claim 1, comprising:

transmitting by the first UE operating in accordance with the first radio access technology, first control signaling indicating the first resource pattern to a second UE operating in accordance with the first radio access technology.

3. The method of claim 2, comprising:

receiving second control signaling indicating approval of the first resource pattern or indicating a second resource pattern that differs from the first resource pattern, wherein the selecting is based at least in part on the second control signaling.

4. The method of claim 1, wherein monitoring the resource group comprises:

receiving, from a second UE, sidelink control information indicating that the second UE operates in accordance with the first radio access technology.

5. The method of claim 1, wherein monitoring the resource group comprises:

receiving, from a second UE, a control message indicating that the second UE operates in accordance with the first radio access technology.

6. The method of claim 5, wherein communicating the first sidelink message comprises:

determining a first number of devices, including the second UE, that operate in accordance with the first radio access technology, and a second number of devices that operate in accordance with the second radio access technology, wherein the ratio is determined based at least in part on the first number of devices and the second number of devices.

7. The method of claim 1, wherein communicating the first sidelink message comprises:

communicating, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

8. The method of claim 1, comprising:

transmitting, via the first radio access technology, a second sidelink message in a second resource of the resource group indicated by the first resource pattern to be allocated to the second radio access technology based at least in part on a priority of the second sidelink message.

9. The method of claim 1, wherein selecting the first resource pattern comprises:

selecting the first resource pattern to allocate some or all resources of the resource group to the first radio access technology based at least in part on the ratio, wherein remaining resources are allocated to the second radio access technology based at least in part on the ratio.

10. The method of claim 1, comprising:

transmitting or receiving a sidelink control channel signal of the second radio access technology in one or more transmission time intervals.

11. The method of claim 1, comprising:

transmitting or receiving control signaling indicating the plurality of different resource patterns.

12. The method of claim 1, wherein monitoring the resource group comprises:

determining a first number of decoded messages that are of the first radio access technology, and a second number of decoded messages that are of the second radio access technology, wherein the ratio is determined based at least in part on the first number of decoded messages and the second number of decoded messages.

13. The method of claim 1, wherein monitoring the resource group comprises:

monitoring the resource group to determine a first channel busy ratio for the first radio access technology, and a second channel busy ratio for the second radio access technology, wherein the ratio is determined based at least in part on the first channel busy ratio and the second channel busy ratio.

14. The method of claim 1, comprising:

determining an updated ratio based at least in part on the monitoring; and selecting a second resource pattern of the plurality of different resource patterns based at least in part on the updated ratio.

15. The method of claim 1, wherein the plurality of different resource patterns comprises a plurality of different time division multiplexing resource patterns.

16. The method of claim 1, wherein the first resource pattern comprises a sidelink feedback channel that occurs periodically or semi-persistently.

17. The method of claim 1, wherein the first radio access technology comprises a new radio (NR) radio access technology and the second radio access technology comprises a long term evolution (LTE) radio access technology.

18. The method of claim 1, comprising:

receiving, by the first UE operating in accordance with the first radio access technology, first control signaling indicating the first resource pattern.

19. An apparatus for wireless communication at a first user equipment (UE), comprising:

a processor;

memory coupled with the processor; and instructions stored in the memory and executable by the processor to cause the apparatus to:

monitor a resource group of a sidelink channel for an indication of sidelink messaging traffic;

determine a ratio of sidelink messaging traffic by a first radio access technology relative to sidelink messaging traffic by a second radio access technology based at least in part on the instructions to monitor the resource group;

select, based at least in part on the ratio, a first resource pattern of a plurality of different resource patterns; and communicate, via the sidelink channel, a first sidelink message within a first resource of the resource group in accordance with the first resource pattern.

20. The apparatus of claim 19, wherein the instructions further cause the apparatus to:

transmit by the first UE that is in operation in accordance with the first radio access technology, first control signaling that indicates the first resource pattern to a second UE that is in operation in accordance with the first radio access technology.

21. The apparatus of claim 19, wherein, to monitor the resource group, the instructions cause the apparatus to:

receive, from a second UE, sidelink control information that indicates that the second UE operates in accordance with the first radio access technology.

22. The apparatus of claim 19, wherein, to monitor the resource group, the instructions cause the apparatus to:

receive, from a second UE, a control message that indicates that the second UE operates in accordance with the first radio access technology.

23. The apparatus of claim 19, wherein, to communicate the first sidelink message, the instructions cause the apparatus to:

communicate, via the first radio access technology, the first sidelink message in a first portion of one or more resource blocks of the resource group allocated to the first radio access technology during a transmission time interval in accordance with the first resource pattern, a second portion of one or more resource blocks of the resource group being allocated to the second radio access technology.

24. The apparatus of claim 19, wherein the instructions further cause the apparatus to:

transmit, via the first radio access technology, a second sidelink message in a second resource of the resource group indicated by the first resource pattern to be allocated to the second radio access technology based at least in part on a priority of the second sidelink message.

25. The apparatus of claim 19, wherein, to select the first resource pattern, the instructions cause the apparatus to:

select the first resource pattern to allocate some or all resources of the resource group to the first radio access technology based at least in part on the ratio, wherein remaining resources are allocated to the second radio access technology based at least in part on the ratio.

26. The apparatus of claim 19, wherein the instructions further cause the apparatus to:

transmit or receive a sidelink control channel signal of the second radio access technology in one or more transmission time intervals.

27. The apparatus of claim 19, wherein the instructions further cause the apparatus to:

transmit or receive control signaling that indicates the plurality of different resource patterns.

28. The apparatus of claim 19, wherein, to monitor the resource group, the instructions cause the apparatus to:

determine a first number of decoded messages that are of the first radio access technology, and a second number of decoded messages that are of the second radio access technology, wherein the ratio is determined based at least in part on the first number of decoded messages and the second number of decoded messages.

29. The apparatus of claim 19, wherein, to monitor the resource group, the instructions cause the apparatus to:

monitor the resource group to determine a first channel busy ratio for the first radio access technology, and a second channel busy ratio for the second radio access technology, wherein the ratio is determined based at least in part on the first channel busy ratio and the second channel busy ratio.

30. The apparatus of claim 19, wherein the instructions further cause the apparatus to:

receive, by the first UE that is in operation in accordance with the first radio access technology, first control signaling that indicates the first resource pattern.

31. An apparatus for wireless communication at a first user equipment (UE), comprising:

means for monitoring a resource group of a sidelink channel for an indication of sidelink messaging traffic;

means for determining a ratio of sidelink messaging traffic by a first radio access technology relative to sidelink messaging traffic by a second radio access technology based at least in part on the means for monitoring the resource group;

means for selecting, based at least in part on the ratio, a first resource pattern of a plurality of different resource patterns; and means for communicating, via the sidelink channel, a first sidelink message within a first resource of the resource group in accordance with the first resource pattern.

32. A non-transitory computer-readable medium storing code for wireless communication at a first user equipment (UE), the code comprising instructions executable by one or more processors to cause the first UE to:

monitor a resource group of a sidelink channel for an indication of sidelink messaging traffic;

determine a ratio of sidelink messaging traffic by a first radio access technology relative to sidelink messaging traffic by a second radio access technology based at least in part on the instructions to monitor the resource group;

select, based at least in part on the ratio, a first resource pattern of a plurality of different resource patterns; and communicate, via the sidelink channel, a first sidelink message within a first resource of the resource group in accordance with the first resource pattern.

* * * * *